United States Patent [19]

Kawara

[11] Patent Number: 5,838,872
[45] Date of Patent: Nov. 17, 1998

[54] IMAGE INFORMATION RECORDING APPARATUS AND IMAGE INFORMATION RECORDING METHOD

[75] Inventor: Toshiyuki Kawara, Hirakata, Japan

[73] Assignee: Matsushita Electric Industrial Co., Ltd., Kadoma, Japan

[21] Appl. No.: 617,486

[22] Filed: Mar. 15, 1996

[30] Foreign Application Priority Data

Mar. 20, 1995 [JP] Japan ................................. 7-060758

[51] Int. Cl.$^6$ ............................. H04N 5/91; H04N 5/917
[52] U.S. Cl. ............................. 386/68; 386/109
[58] Field of Search ............................. 386/46, 95, 96, 386/104, 109, 111, 1, 27, 29, 73, 39; 348/384; H04N 5/91, 5/917

[56] References Cited

U.S. PATENT DOCUMENTS

| | | | |
|---|---|---|---|
| 4,777,537 | 10/1988 | Ueno et al. | 386/96 |
| 5,568,274 | 10/1996 | Fujinami et al. | |

FOREIGN PATENT DOCUMENTS

| | | |
|---|---|---|
| 530454 | 2/1993 | Japan . |
| 767067 | 3/1995 | Japan . |
| 767068 | 3/1995 | Japan . |
| 7212768 | 8/1995 | Japan . |

OTHER PUBLICATIONS

Japanese Search Report for International Application No. PCT/JP96/00642 mailed Jul. 16, 1996 (with English translation thereof).

Primary Examiner—Robert Chevalier
Attorney, Agent, or Firm—Renner, Otto, Boisselle & Sklar, P.L.L.

[57] ABSTRACT

The image information recording apparatus includes: a coder for generating a plurality of group data, each of the plurality of group data including at least intra-coded picture data, by receiving and coding a plurality of picture data, each of the plurality of picture data corresponding to a picture; a sector address generator for generating a sector address indicating a top sector among a plurality of sectors on a recording medium in which auxiliary data corresponding to each of the plurality of group data is recorded; a jump address generator for outputting, as a jump address of first group data among the plurality of group data, a top sector address among a plurality of sector addresses of the auxiliary data, the auxiliary data being located immediately anterior to second group data including second picture data to be reproduced in a normal reproduction operation at a second time later than a first time by a predetermined fixed time period, the first time being a time when first picture data located at a top of the first group data is reproduced in the normal reproduction operation; and a recorder for recording on the recording medium the first group data and the auxiliary data including the jump address.

40 Claims, 12 Drawing Sheets

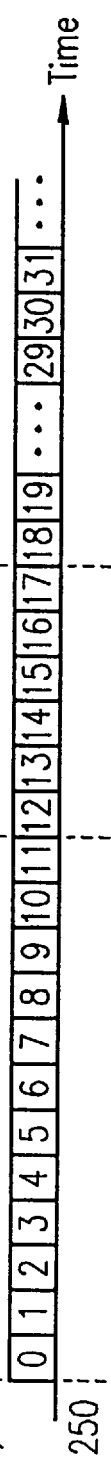
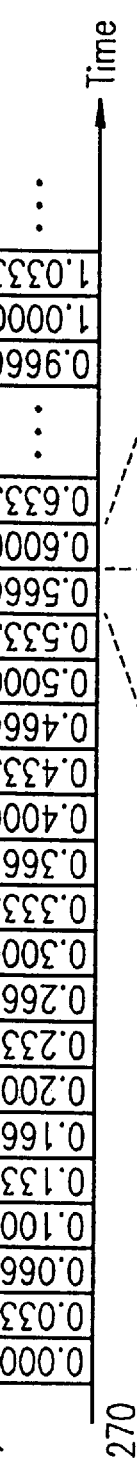
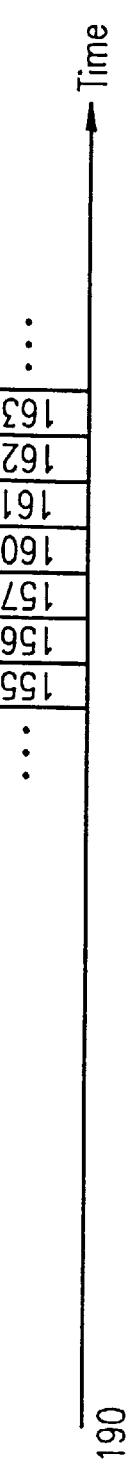
FIG. 8(A)
FIG. 8(B)
FIG. 8(C)
FIG. 8(D)

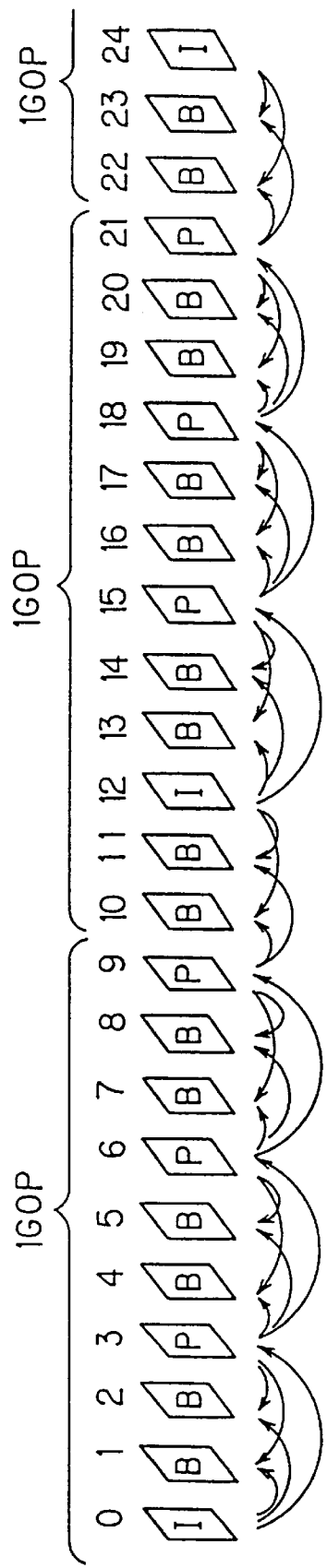

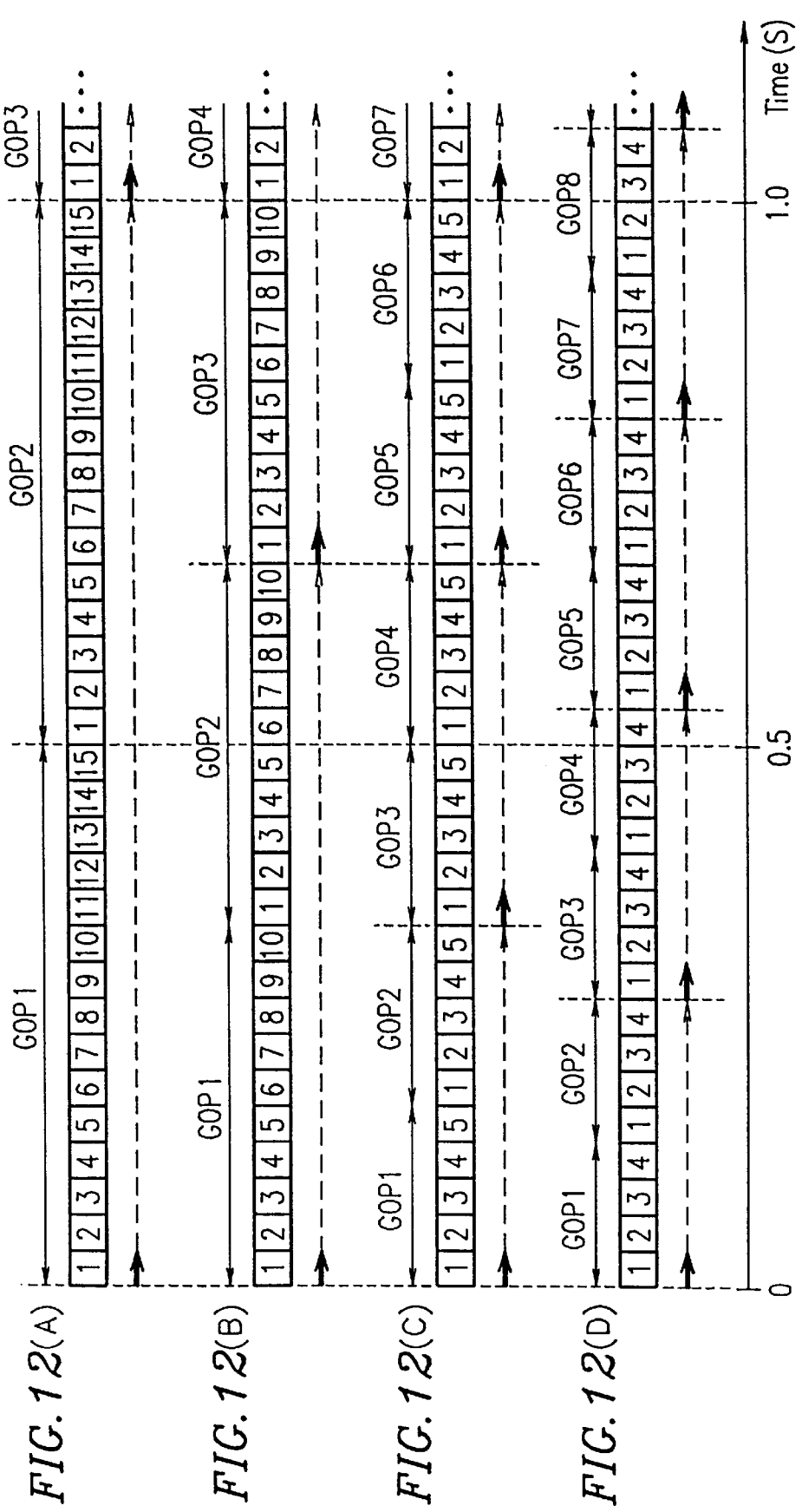

IMAGE INFORMATION RECORDING APPARATUS AND IMAGE INFORMATION RECORDING METHOD

BACKGROUND OF THE INVENTION

1. Field of the Invention

The present invention relates to an image information recording apparatus and an image information recording method for recording a video signal on a recording medium such as an optical disk. More specifically, the present invention relates to an image information recording apparatus and an image information recording method for performing a trick play reproduction operation at a constant speed or scale factor.

2. Description of the Related Art

As digital storage media have been developed, it has become more and more necessary to record a long-time moving picture in such recording media. Reflecting such tendencies, it has also become desirable to transmit a larger amount of moving picture in the fields of communications and broadcasting. In order to accomplish such purposes, high efficiency coding technologies have recently been examined. In International Organization for Standardization (ISO), standardization activities are now carried on with respect to various methods for coding a moving picture by Moving Picture Experts Group (MPEG) of International Electrotechnical Commission (IEC). A standard for a moving picture includes, for example, "ISO/IEC 13818".

According to a coding method complying with an MPEG standard, in order to reduce the redundancy in the time-axis direction at first, a motion compensation is performed, thereby obtaining a difference between images, and then, in order to reduce the redundancy in the space-axis direction, a discrete cosine transform (DCT), a quantization and a variable-length coding are performed for the images. In addition, an image unit called "GOP (group of pictures)" consisting of a plurality of pictures is provided. In each GOP, a picture to be coded first is an intra-coded picture. In the following description, a "picture" is assumed to mean a frame in a frame mode complying with an MPEG standard and a field in a field mode. In this specification, a so-called "frame rate", i.e., the number of pictures per second, is set to be 30. However, the rate is not limited thereto. For example, the frame rate complying with the National Television System Committee (NTSC) standard is 29.97, and the frame rate complying with the Phase Alternation Line (PAL) standard is 25.

FIG. 11 is a structure diagram showing exemplary structures for respective GOPs. In general, each GOP consists of three types of coded pictures: an intra-coded picture (hereinafter, simply referred to as an "I picture"); an inter-picture forward predictive-coded picture (hereinafter, simply referred to as a "P picture"); and an inter-picture bidirectionally predictive-coded picture (hereinafter, simply referred to as a "B picture"). An I picture is a picture for performing an intra-picture coding without reference to other pictures; a P picture is a picture for performing an inter-picture coding with reference to an I picture or another P picture temporally anterior to the P picture itself; and a B picture is a picture for performing a bidirectional predictive coding with reference to an I picture or a P picture temporally anterior and posterior to the B picture itself. The inter-picture forward predictive coding and the inter-picture bidirectional predictive coding are known generically as an "inter-picture coding". In the example shown in FIG. 11, a second GOP (i.e., a GOP having GOP number 2) consists of 12 pictures, and P pictures are inserted in the GOP every two pictures.

In decoding, an I picture can be reproduced without reference to other pictures. A P picture is inter-picture decoded with reference to an I picture or another P picture temporally anterior to the P picture itself. Accordingly, in decoding the P picture, the I picture or the another P picture temporally anterior to the P picture itself is required to have been decoded. A B picture is decoded bidirectionally using an I picture or a P picture temporally anterior and posterior to the B picture itself. Accordingly, in decoding, the B picture cannot be decoded unless the I picture or the P picture to be used for the prediction, which is temporally anterior or posterior to the B picture itself, has been decoded. Therefore, a compression coding is performed in the order shown in FIG. 11.

The data which have been compression-coded in this way are recorded on a recording medium in the following manner. First, the intra-picture compression-coded data (i.e., the I picture data) and the inter-picture compression-coded data (i.e., the P picture data or the B picture data) are arranged on the time axis and various types of codes are applied thereto, thereby integrating these data into one data. Then, the integrated data is divided into a plurality of sectors, each of which has a constant capacity. An address is provided for each of the divided sectors, and the sectors are recorded on the recording medium.

In the case of reproducing the image information which has been recorded on the recording medium by the above-described method, the reproduction operation is proceeded while identifying the addresses of the respective sectors. In performing a high-speed reproduction operation in accordance with conventional technologies, one I picture is reproduced once for a constant number of GOPs. In this method, the number of the pictures composing one GOP is assumed to be constant. In such a case, I pictures to be reproduced in the high-speed reproduction operation are pictures to be reproduced at invariable intervals in a normal reproduction operation. Assuming that two adjacent pictures reproduced at an interval Th in the high-speed reproduction operation are reproduced at an interval Tn in the normal reproduction operation, the reproduction scale factor R can be defined as: $R=Tn/Th$. Therefore, according to conventional technologies, if the number of the pictures composing one GOP is constant, then the reproduction scale factor R also becomes constant.

FIG. 12 is a structure diagram illustrating how the reproduction scale factor R is varied in the case where an image, in which the number of the pictures included in one GOP is variable, is high-speed reproduced by conventional technologies. FIG. 12 shows a high-speed reproduction operation in which one I picture is reproduced once for every two GOPs. In performing a normal reproduction operation, two successive pictures are assumed to be reproduced at an interval of 1/30 (s). In the portion (A) in FIG. 12, an image in which one GOP includes 15 pictures is shown. In the case of the portion (A) in FIG. 12, the interval Tn is $15\times 2/30=1$ (s), while the interval Th is 1/30 (s). Accordingly, the reproduction scale factor R is 30. In other words, a normally reproducible image has been time-axis-compressed by 30.

In the portion (B) in FIG. 12, in the same way as in the portion (A) in FIG. 12, the reproduction scale factor R is: $Tn/Th=(10\times 2/30)/(1/30)=20$. In the portions (C) and (D) in FIG. 12, the reproduction scale factors R become 10 and 8, respectively. As described above, in the case where the number of the pictures composing one GOP is varied, the reproduction scale factor R is also varied.

The conventional technologies, however, have paid no regard to the fact that, when the number of the pictures per GOP is varied, the reproduction scale factor R is also varied.

SUMMARY OF THE INVENTION

According to one aspect of the present invention, an image information recording apparatus is provided. The image information recording apparatus includes: a coder for generating a plurality of group data, each of the plurality of group data including at least intra-coded picture data, by receiving and coding a plurality of picture data, each of the plurality of picture data corresponding to a picture; a sector address generator for generating a sector address indicating a top sector among a plurality of sectors on a recording medium in which auxiliary data corresponding to each of the plurality of group data is recorded; a jump address generator for outputting, as a jump address of first group data among the plurality of group data, a top sector address among a plurality of sector addresses of the auxiliary data, the auxiliary data being located immediately anterior to second group data including second picture data to be reproduced in a normal reproduction operation at a second time later than a first time by a predetermined fixed time period, the first time being a time when first picture data located at a top of the first group data is reproduced in the normal reproduction operation; and a recorder for recording on the recording medium the first group data and the auxiliary data including the jump address corresponding to the first group data so that the auxiliary data including the jump address of the first group data is located adjacent to the first group data on the recording medium.

According to another aspect of the present invention, an image information recording method is provided. The method includes the steps of: generating a plurality of group data, each of the plurality of group data including at least intra-coded picture data, by receiving and coding a plurality of picture data, each of the plurality of picture data corresponding to a picture; generating a sector address indicating a top sector among a plurality of sectors on a recording medium in which auxiliary data corresponding to each of the plurality of group data is recorded; outputting, as a jump address of first group data among the plurality of group data, a top sector address among a plurality of sector addresses of the auxiliary data, the auxiliary data being located immediately anterior to second group data including second picture data to be reproduced in a normal reproduction operation at a second time later than a first time by a predetermined fixed time period, the first time being a time when first picture data located at a top of the first group data is reproduced in the normal reproduction operation; and recording on the recording medium the first group data and the auxiliary data including the jump address corresponding to the first group data so that the auxiliary data including the jump address of the first group data is located adjacent to the first group data on the recording medium.

In one embodiment, assuming that the first time and the second time are denoted by T1 and T2, respectively, and that a positive value $\Delta Ti$ (where i=1 to n, and i and n are natural numbers) is used, a first equation:

$$T2 = T1 + \sum_{i=1}^{n} \Delta Ti$$

is satisfied, and the auxiliary data includes the n kinds of jump addresses corresponding to the second time determined by the first equation.

In another embodiment, assuming that the first time and the second time are denoted by T1 and T2, respectively, and that a positive value $\Delta Ti$ (where i=1 to n, and i and n are natural numbers) is used, a second equation:

$$T2 = T1 - \sum_{i=1}^{n} \Delta Ti$$

is satisfied, and the auxiliary data includes the n kinds of jump addresses corresponding to the second time determined by the second equation.

In still another embodiment, the positive value $\Delta Ti$ monotonically increases for the natural number i.

In still another embodiment, the auxiliary data including the jump addresses is recorded on the recording medium so that the intra-coded picture data is reproduced at an interval in a range from 0.4 (s) to 1.0 (s), both inclusive, in the normal reproduction operation, the intra-coded picture data being recorded adjacent to the plurality of sectors in which the auxiliary data including the jump addresses is recorded.

In still another embodiment, the natural number n satisfies 1<=n<=nmax (nmax: integer) and nmax>=5.

In still another embodiment, the auxiliary data including the jump addresses includes offset data corresponding to a difference between a third time and the second time, the third time being a time when third picture data, located in a top sector of the second picture data, is reproduced in the normal reproduction operation.

In still another embodiment, the offset data represents an interval between the second time and the third time.

In still another embodiment, the offset data represents a difference between a picture number represented by the second picture data and a picture number represented by the third picture data.

Thus, in view of the variation of the reproduction scale factor R in accordance with the variation of the number of the pictures per GOP, the invention described herein makes possible the advantage of providing apparatus and method for recording image information without varying the reproduction scale factor R in a trick play reproduction operation.

This and other advantages of the present invention will become apparent to those skilled in the art upon reading and understanding the following detailed description with reference to the accompanying figures.

BRIEF DESCRIPTION OF THE DRAWINGS

FIG. 8 is a timing chart showing the respective data in FIG. 7.

FIG. 11 is a structure diagram showing exemplary structures for respective GOPs.

FIG. 12 is a structure diagram illustrating how the reproduction scale factor is varied in the case where an image, in which the number of pictures included in one GOP is variable, is high-speed reproduced by conventional technologies.

DESCRIPTION OF THE PREFERRED EMBODIMENTS

Figure 1:
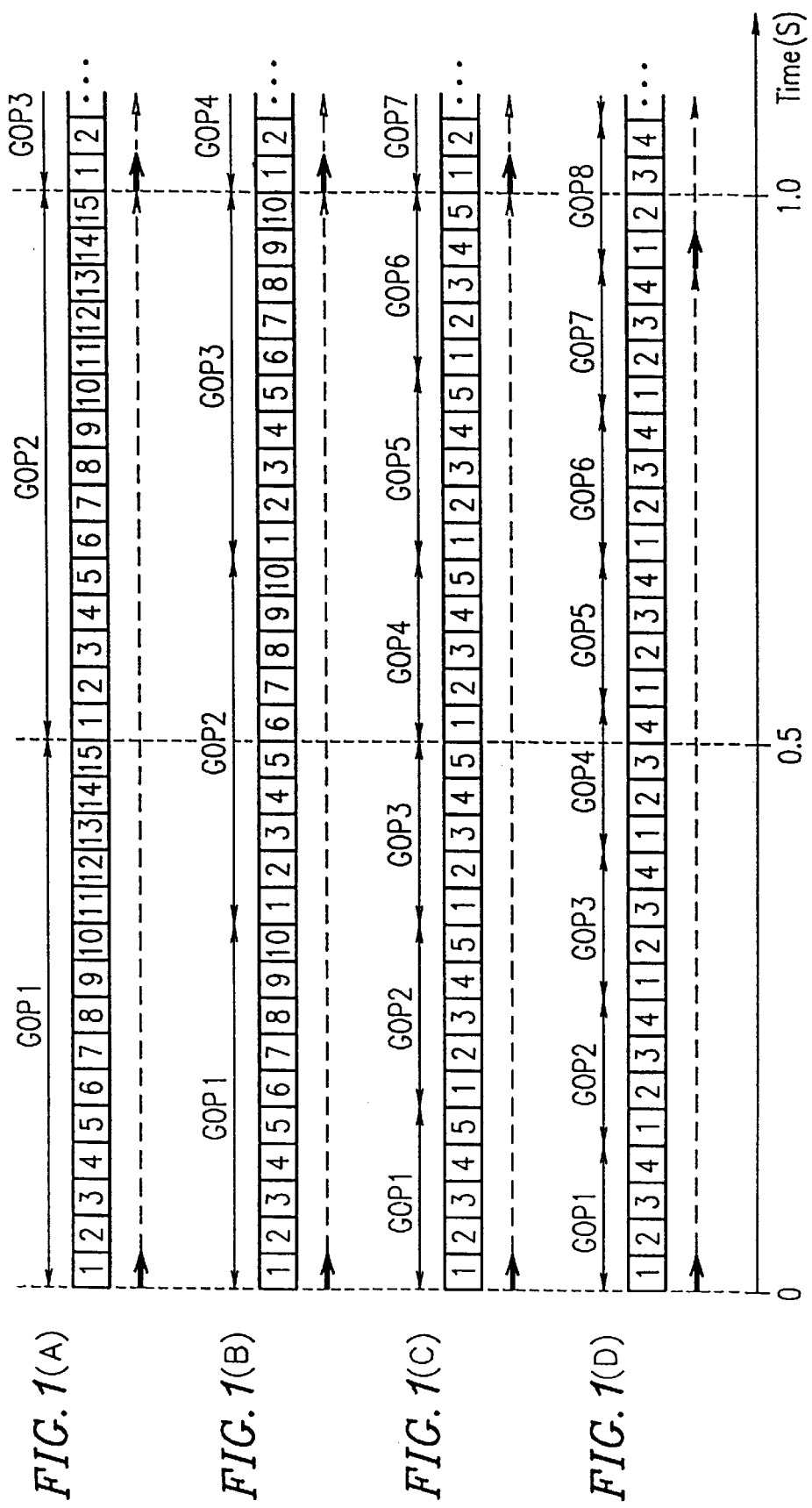
FIG. 1 is a structure diagram illustrating a high-speed reproduction operation of the image information which has been recorded by image information recording apparatus and method in the first example of the present invention.

Hereinafter, the present invention will be described by way of illustrative examples with reference to the accompanying drawings. In the following description, it is assumed that the same reference numeral denotes the same component, and that "data representing a picture" will be shortened as "picture data" for simplification. Similarly, "GOP data" is a shortened form of "data representing a GOP".

EXAMPLE 1

In the following examples, a GOP (group of pictures) defined in compliance with the MPEG2 standard (i.e., the above-mentioned international standard ISO/IEC 13818) will be used as the GOP. In this specification, a "picture" is assumed to mean a frame when a frame mode complying with the MPEG2 standard is used and mean a field when a field mode complying with the MPEG2 standard is used. In other words, the present invention is applicable to both of the case where a frame is used as a picture and a case where a field is used as a picture.

In this specification, two successive pictures are assumed to be reproduced at an interval of 1/30 (s) (or a picture rate is assumed to be 30) in the normal reproduction operation. However, the picture rate is not limited thereto, but may be 29.97 or 25, for example. In the high-speed reproduction operation, the interval between two pictures to be reproduced is equal to that in the normal reproduction operation, i.e., 1/30 (s). However, in performing the high-speed reproduction operation, all the pictures are not reproduced but some pictures are skipped (i.e., not reproduced). For example, if the above-mentioned reproduction scale factor R is 30, then, after the first picture is reproduced, the second to the thirtieth pictures are not reproduced and the thirty-first picture is reproduced. The interval between the time when the first picture is reproduced and the time when the thirty-first picture is reproduced is equal to the interval in the normal reproduction operation, i.e., 1/30 (s).

In the following description, the former picture of two adjacent pictures reproduced in the high-speed reproduction operation will be called a "preceding picture", while the latter picture to be reproduced immediately after the "preceding picture" is reproduced will be called a "succeeding picture". In the same way, the time when a preceding picture is reproduced will be called a "preceding picture time" and the time when a succeeding picture is reproduced will be called a "succeeding picture time", respectively. In the above-described example where the reproduction scale factor R is 30, the first picture is a preceding picture and the thirty-first picture is a succeeding picture. Also, if the reproduction scale factor R is 30, the interval between a preceding picture time and a succeeding picture time is 1 (s). That is to say, since the picture to be reproduced at an interval of 1 (s) in the normal reproduction operation is reproduced at an interval of 1/30 (s) in this high-speed reproduction operation, the reproduction scale factor R becomes 30.

In this specification, for the sake of the simplicity, necessary time for the jump operation (specifically, movement of the optical pickup on the optical disk, tracking, and the like) which occurs between the reproduction of the preceding picture and the reproduction of the succeeding picture is assumed to be zero.

There are two types of high-speed reproduction operations, namely, a forward high-speed reproduction operation and a backward high-speed reproduction operation. A forward high-speed reproduction operation refers to a high-speed reproduction operation in which a succeeding picture time is later than a preceding picture time. On the other hand, a backward high-speed reproduction operation refers to a high-speed reproduction operation in which a succeeding picture time is earlier than a preceding picture time.

FIG. 1 is a structure diagram illustrating a high-speed reproduction operation of the image information which has been recorded by the image information recording apparatus and method in the first example of the present invention. In this case, the reproduction scale factor R is assumed to be constant, e.g., 30, in an ideal state. In other words, the interval between a preceding picture time and a succeeding picture time is assumed to be set at 1 (s) in the ideal state. In the portions (A) through (D) in FIG. 1, the numbers sequentially assigned from the top (or sequentially from left to right on the time axis) indicate the positions of respective pictures in a GOP. The number of the pictures included in one GOP (hereinafter, the number will be simply referred to as a "picture number of GOP") is variable among 15, 10, 5 and 4. The picture 1 to be normally reproduced at a time t (=0 (s)) is assumed to be a preceding picture here. In the portions (A) through (D) in FIG. 1, the pictures corresponding to the periods indicated by the solid-line arrows are reproduced but the pictures corresponding to the periods indicated by the broken-line arrows are not reproduced. For simplification, it is assumed that the pictures indicated by the broken-line arrow are instantaneously skipped after a preceding picture is reproduced. In this specification, the top picture of a GOP before coding on the time axis is assumed to be an I picture for simplification. However, the top picture of a GOP in time axis is not limited thereto, but may also be a B picture or a P picture. On the other hand, a GOP may be composed of I pictures and P pictures without any B pictures, or may be composed of I pictures only.

In any of the cases shown in the portions (A) to (C) in FIG. 1, the interval between a preceding picture time and a succeeding picture time is 1.0 (s) and the reproduction scale factor R is 30.

In the case shown in the portion (D) in FIG. 1, in order to set the interval between the preceding picture time and the succeeding picture time to be 1 (s), when the preceding picture is located at the time t (=0), the succeeding picture should be a picture 3 of GOP8. However, it is necessary, in the actual operation, to start the reproduction operation with the top picture of a GOP which is an intra-coded picture. Therefore, in the first example, in such a case, it is assumed that the picture 1 of GOP8 is reproduced instead of the picture 3 of GOP8 immediately after the preceding picture or the picture 1 of GOP1 is reproduced. A picture which should be a succeeding picture for realizing a constant reproduction scale factor R, e.g., the picture 3 of GOP8 in the above-described example, will be called a "destination picture". On the other hand, a picture actually reproduced as the succeeding picture, e.g., the picture 1 of GOP8 in the above-described example, will be called a "succeeding picture". In the cases shown in the portions (A) to (C) in FIG. 1, the destination picture accords with the succeeding picture. On the other hand, in the case shown in the portion (D) in FIG. 1, the succeeding picture (the picture 1 of GOP8) is not the destination picture (the picture 3 of GOP8), and the interval between the preceding picture and the succeeding picture is 28/30 (s) and the reproduction scale factor R is 28.

To sum up the foregoing description, a succeeding picture can be regarded as the top picture of a GOP including a destination picture in reproducing the image information recorded according to the present invention. Hereinafter, a GOP including a preceding picture will be called a "preceding GOP" and a GOP including a succeeding picture will be called a "succeeding GOP", respectively. A destination picture is also included in a succeeding GOP.

A "top picture of a GOP" to which a plurality of pictures belong refers to a picture represented by the picture data to be decoded first in the normal reproduction operation among the picture data recorded as GOP data. According to the MPEG1 and MPEG2 standards to which the present invention is applied, the top picture data of GOP data is I picture data on an optical disk. In this specification, the preceding picture is a top picture of a GOP (i.e., an I picture).

If the image information recorded by the apparatus and the method of the invention is reproduced, even if a high-speed reproduction operation is performed, the interval between a preceding picture time and a succeeding picture time becomes substantially regular (or the reproduction scale factor R becomes substantially constant) as shown in the portions (A) to (D) in FIG. 1, unlike the conventional example shown in FIG. 12. A jerky unnatural image to be caused in a high-speed reproduction operation when the number of the pictures included in one GOP is variable can be eliminated by utilizing the apparatus and/or the method of the present invention (or by setting the reproduction scale factor R to be substantially constant). In this specification, the degree to which the reproduction scale factor R is constant in the high-speed reproduction operation will be called a "time-axis linearity". For example, it is recognized that the time-axis linearity can be completely maintained in the cases shown in the portions (A) to (C) in FIG. 1.

Figure 2:
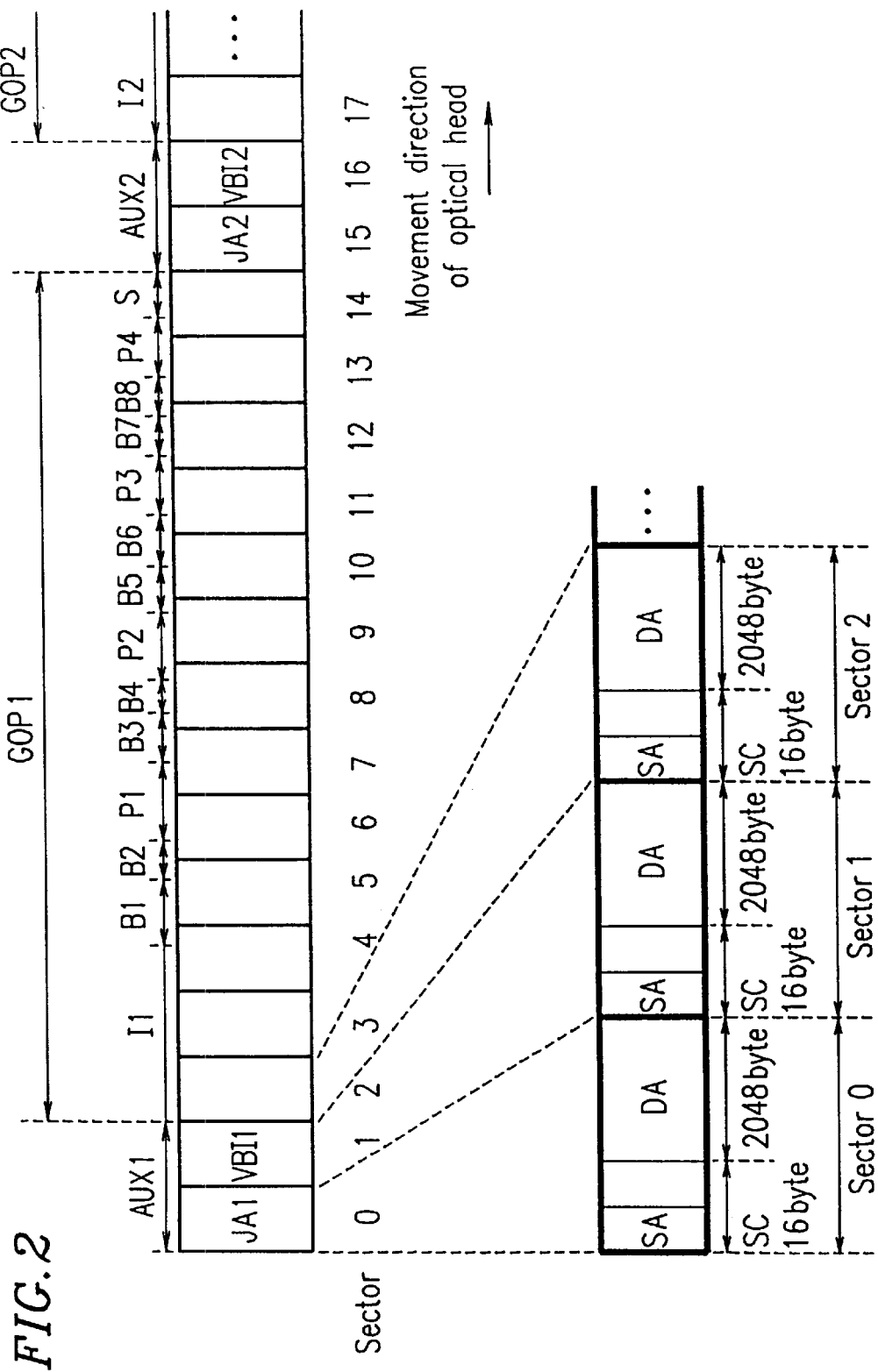
FIG. 2 is a structure diagram schematically showing the data recorded on a recording medium by the image information recording apparatus and method in the first example of the present invention.

FIG. 2 schematically shows the data recorded on a recording medium by the image information recording apparatus and method in the first and the second example of the present invention. In the following examples, a digital versatile disk (DVD), one of optical disks, is used as a medium on which the image data is recorded. The data has been recorded on the tracks spirally formed on an optical disk. By making a motor rotate the optical disk, an optical head for reading out the recorded data moves relative to the tracks. In FIG. 2, the optical head moves from left to right in the normal reproduction operation. It is noted that the rotation of the disk is controlled by a constant linear velocity (CLV) system, and the linear velocity is about 4 m/s.

As shown in FIG. 2, the GOP data (denoted by GOP1 and GOP2) and the auxiliary data (denoted by AUX1 and AUX2) are recorded on a sector basis. The sectors are obtained by partitioning a part of the tracks on the optical disk, and a lead-in area, a file management information area and a data region are disposed in this order from the inner peripheral side to the outer peripheral side of the optical disk. The GOP data and the auxiliary data to be described in detail later are recorded in the data region.

The numbers assigned to the respective sectors are called "sector addresses" (denoted by SA in FIG. 2) and are integers represented by the data of 4 bytes. A sector address SA is included in a sub-code (denoted by SC in FIG. 2) having a data length of 16 bytes. In the region of 16 bytes of the sub-code other than the region of 4 bytes of the sector address SA, additional data, such as necessary information for controlling a disk, or an error correction code for the sub-code SC, is recorded. The sub-code SC (16 bytes) and the data area DA (2048 bytes) are recorded in each sector. As shown in FIG. 2, the sub-code SC is recorded on the recording medium so as to be located immediately anterior to the region where the data area DA is recorded. When the terms, such as "anterior" or "top", are referred to in this specification, the time sequence which the terms indicate is the temporal order of data retrieved from an optical disk by a head in the normal reproduction, i.e., the order where the head reaches the data on the optical disk. For example, when data A is "anterior" to data B, data A is retrieved before data B is retrieved from the optical disk in the normal reproduction mode.

Both the GOP data and the auxiliary data corresponding thereto are recorded in the region for the data area DA in each sector. When the data consisting of the sub-code SC and the data area DA are actually recorded in each sector on the recording medium, an error correction code (ECC) is added to the data having 2064 bytes (i.e., 16 bytes of the sub-code and 2048 bytes of the data area DA), and then the data is recorded. FIG. 2 shows a detailed format for the sectors 0 to 2 only. However, all of the GOP data and the auxiliary data are recorded as the data area DA. It is noted that a sector address begins with zero for convenience of description.

The GOP data GOP1 shown in FIG. 2 includes intra-coded picture data (I picture data) and inter-coded picture data (P picture data and/or B picture data). The I picture data of the GOP data GOP1 is included in the sectors 2 to 4 shown in FIG. 2. In GOP1, the P picture data P1 to P4 and the B picture data B1 to B8 are included in the sectors 4 to 14. A boundary between adjacent picture data is not always aligned with the boundary between the sectors in which the two picture data are located. In the region of the sector 14 in which the P picture data P4 is not recorded is filled with so-called stuffing bytes S. As a result, the trailer of the GOP data GOP1 is aligned with the trailer of the last sector (sector 14 in FIG. 2). The trailer of the GOP data is always aligned with the trailer of a sector. At the top of the GOP data, an I picture data is recorded.

The auxiliary data AUX is recorded in the two sectors (e.g., sectors 0 and 1 in FIG. 2) immediately anterior to the GOP data on the optical disk. The auxiliary data AUX is the data other than the picture data (I picture data, P picture data and B picture data) and includes at least a jump address JA. However, the auxiliary data AUX may include other types of data excluding the picture data. In this specification, the auxiliary data AUX is assumed to include the jump address (e.g., sector 0 in FIG. 2) and video blanking information VBI (e.g., sector 1 in FIG. 2). However, it does not mean that the auxiliary data not including the video blanking information VBI is not utilized in applications to which the present invention is applicable. In addition, the auxiliary data AUX may also be recorded either in one sector or in three or more sectors. The video blanking information VBI is a signal output during a vertical retrace interval of a video signal and includes a signal for a closed caption, a signal for a copy generation management, and the like.

The jump address JA recorded in the sector 0 indicates a top sector address of the auxiliary data AUX which is located immediately anterior to the succeeding GOP data. For example, when the succeeding picture is an I picture to be recorded from the sector 17 on, the succeeding GOP is GOP2, and the jump address JA of the preceding picture is "15".

As described above, plural sets of the coded image data and the accompanying data thereof (i.e., the jump address JA and the video blanking information VBI), each set consisting of GOP data and auxiliary data which is located immediately anterior to the GOP data and corresponds to the GOP data, are recorded on the tracks. In other words, one set of sectors containing the auxiliary data is adjacent to another set of sectors containing GOP data corresponding to the auxiliary data at the top end of the sectors including the GOP data. Although, in an actual recording medium, a sub-code is positioned between a sector of the auxiliary data and a sector of the corresponding GOP data at the boundary thereof, such positional relationship is also referred to as being "adjacent" relationship. Other data are sometimes added to the jump address JA and the video blanking information VBI but each of these data is recorded within one sector. In addition, the header and the trailer of each GOP data can be aligned with the corresponding boundaries of the sectors. It is noted that FIG. 2 schematically shows a structure in which the data are recorded in the respective sectors and that the length of the data is variable depending upon the original image and the coding method.

The GOP1 shown in FIG. 2 is composed of I pictures, P pictures and B pictures. However, the structure of the GOP is not limited thereto, but the GOP may also be composed of I pictures and P pictures or I pictures only. That is to say, GOP data includes at least intra-coded picture data (or the I picture data). In addition, the number of the pictures composing the GOP can be appropriately increased or decreased. For example, if the adjacent pictures are totally different from each other everywhere within one GOP, then adverse effects caused by the prediction error due to the interpicture coding can be prevented by composing the GOP of I pictures only. On the other hand, for increasing the entry points used for the jump operation during reproduction, it is only necessary to compose the GOP of a smaller number of pictures.

Figure 3:
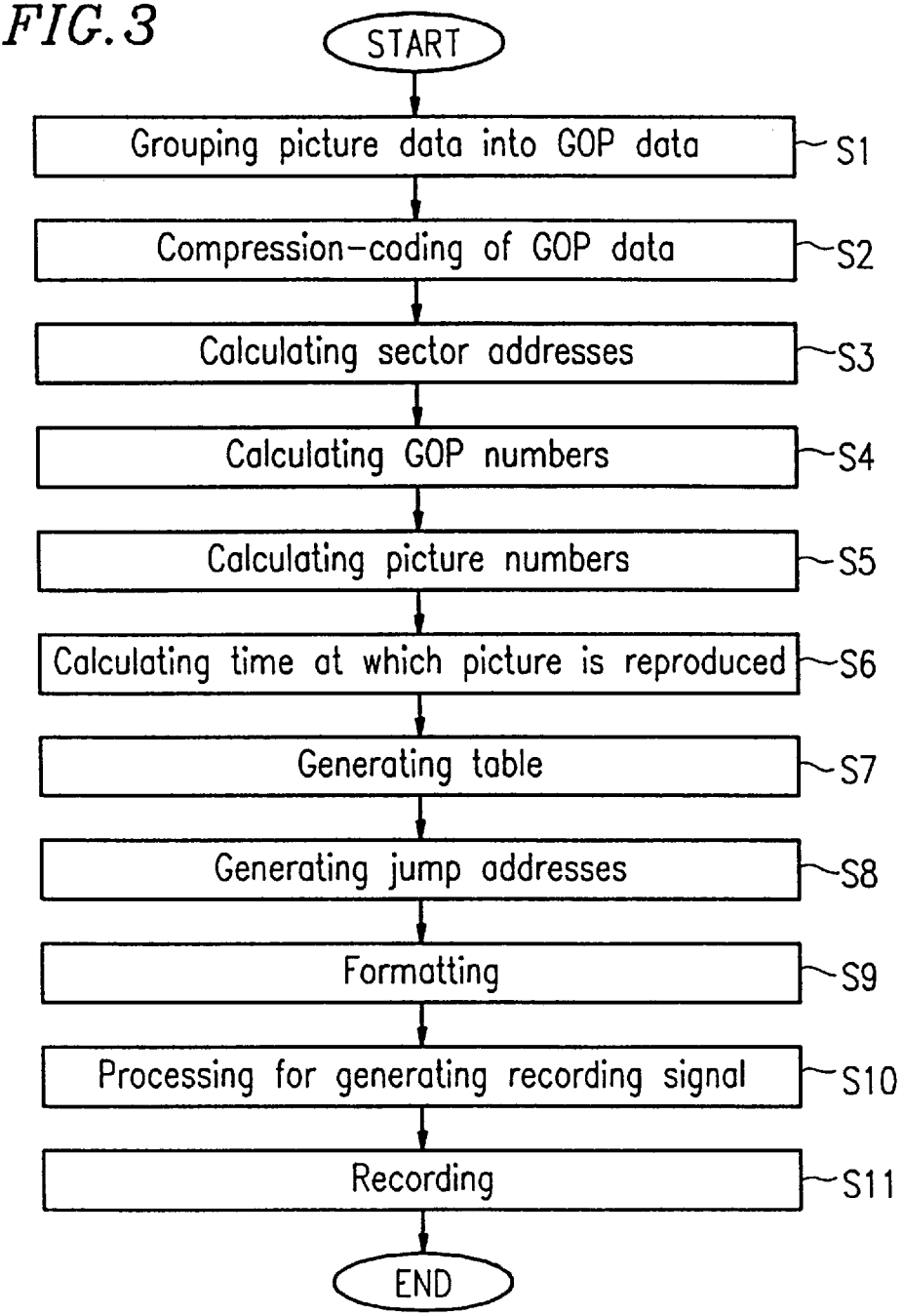
FIG. 3 is a flow chart illustrating a method for recording image information according to the present invention.

FIG. 3 is a flow chart illustrating a method for recording image information according to the present invention. Hereinafter, a method for recording image information according to the present invention will be described with reference to FIG. 3. A commonly used format for a video signal complying with the NTSC standard or the PAL standard is used as a format for an input video signal. The input video signal is converted into a plurality of picture data, each of which represents a picture. The format of these picture data is defined so as to comply with the Recommendation BT.601 of ITU-R (International Telecommunication Union Radiocommunication Sector), originally with the Recommendation 601 of CCIR (the International Radio Consultative Committee).

In Step S1, the picture data are grouped into a plurality of GOP data. In the case where each of the GOP data includes a plurality of picture data, the plurality of picture data included in each GOP data represent successive pictures on the time axis. As described above, the number of the pictures composing one GOP can be set at an arbitrary number depending upon the type of the image, the number of the entry points in the trick play reproduction operation and the like. A group start code (e.g., "group_start_code" having 32 bits defined in MPEG1 and MPEG2 standards) indicating the top of the GOP data is located at the header of each GOP data.

In Step S2, the divided GOPs are compressioncoded so as to include at least the intra-coded picture data (I picture data). In the case where one GOP includes a plurality of pictures, the compression rate can be increased by performing an inter-picture coding instead of the intra-picture coding depending upon the necessity. To the contrary, a case where the GOP data include no inter-coded picture data (P picture data and B picture data) can also occur. The intra-picture coding and the inter-picture coding are realized by known methods. In the following description, the coded GOP data (not the GOP data generated in Step S1 and yet to be coded but the GOP data generated in Step S2) will be simply referred to as "GOP data".

In Step S3, the sector addresses on the optical disk, at which the plurality of GOP data and the auxiliary data corresponding to the respective GOP data are recorded, are calculated. A sector address is calculated using the length of GOP data, the length of auxiliary data and the sector length. More specifically, a counter having an initial value of "0" and an increment of "1" is used. First, since the auxiliary data is recorded immediately anterior to the GOP data, the count value of the counter is incremented from "0" to "2". Next, by receiving the GOP data, the count value is incremented by "1" every time 2048 bytes, i.e., the length of the data area (denoted by DA in FIG. 2), are input. When the top of the GOP data is detected, the count value is incremented by "2". This counting operations generates the sector addresses of the GOP data and the auxiliary data corresponding to the respective GOP data.

In Step S4, the GOP numbers of the GOP data generated in Step S2 are calculated. More specifically, a counter having an initial value of "1" and an increment of "1" is used. By incrementing the count value by "1" every time one GOP data is input to the counter, the GOP numbers can be obtained. The input of one GOP data can be identified by the group start code added in Step S2.

In Step S5, the picture numbers of the picture data included in the GOP data generated in Step S2 are calculated. More specifically, every time the beginning of the next picture (or the "picture_start_code" having 32 bits defined in the MPEG1 and MPEG2 standards) is detected, the picture number is counted by incrementing the count value (initial value is "0") by "1".

In Step S6, the time when each picture is reproduced in the normal reproduction operation is calculated based on the picture number thereof calculated in Step S5. In the first example, the reproduction interval between two pictures in the normal reproduction operation is 1/30 (s). Therefore, the product obtained by multiplying together "1/30 (s)" and the "picture number" becomes equal to the time when the reproduction of the picture is started.

In Step S7, a table for generating the jump addresses is generated using the GOP numbers, the picture numbers, the reproduction times of the pictures, the sector addresses and the top addresses of the auxiliary data which have been calculated in Steps S3 to S6. Table 1 is a table for generating the jump addresses.

TABLE 1

| GOP Number | Picture Number | Reproduction Time | Sector Address | Top Address of Aux. Data | Type of Picture |
|---|---|---|---|---|---|
| 1 | 0 | 0.0000 | 2–30 | 0 | Preceding |
| 1 | 1 | 0.0333 | 31–33 | 0 | |
| 1 | 2 | 0.0666 | 34–36 | 0 | |
| 1 | 3 | 0.1000 | 37–51 | 0 | |
| 1 | 4 | 0.1333 | 52–54 | 0 | |
| 1 | 5 | 0.1666 | 55–57 | 0 | |
| 1 | 6 | 0.2000 | 58–72 | 0 | |
| 1 | 7 | 0.2333 | 73–75 | 0 | |
| 1 | 8 | 0.2666 | 76–78 | 0 | |
| 1 | 9 | 0.3000 | 79–93 | 0 | |
| 1 | 10 | 0.3333 | 94–96 | 0 | |
| 1 | 11 | 0.3666 | 97–99 | 0 | |
| 2 | 12 | 0.4000 | 102–130 | 100 | |
| 2 | 13 | 0.4333 | 131–133 | 100 | |
| 2 | 14 | 0.4666 | 134–136 | 100 | |
| 2 | 15 | 0.5000 | 137–151 | 100 | |
| 2 | 16 | 0.5333 | 152–154 | 100 | |
| 2 | 17 | 0.5666 | 155–157 | 100 | |
| 3 | 18 | 0.6000 | 160–190 | 158 | Succeeding |
| 3 | 19 | 0.6333 | 191–193 | 158 | |
| ... | ... | ... | ... | ... | |
| 3 | 29 | 0.9666 | 257–259 | 158 | |
| 3 | 30 | 1.0000 | 260–274 | 158 | Destination |
| 3 | 31 | 1.0333 | 275–277 | 158 | |
| ... | ... | ... | ... | ... | |

It is noted that the column of "type of picture" is provided for Table 1 for convenience of description and is not necessary for generating the jump addresses.

In Table 1, the GOP data GOP1 (or the GOP data having a GOP number of "1") is composed of 12 picture data (picture 0 to picture 11), for example. The normal reproduction operation of each picture data is started at an interval of 1/30 (s). Auxiliary data corresponding to two sectors are recorded immediately anterior to each GOP data. Accordingly, the GOP data GOP1 is recorded from the sector having a sector address of "2" on. Auxiliary data corresponding to two sectors are also inserted between the GOP data GOP1 and the GOP data GOP2. Therefore, the difference between the sector address at the end of the GOP data GOP1, i.e., "99", and the sector address at the beginning of the GOP data GOP2, i.e., "102", becomes "3".

In Step S8, the jump addresses are obtained based on the table reproduced in Step S7. Hereinafter, a method for obtaining the jump addresses will be described. Herein, assuming that the reproduction scale factor R is 30 and the preceding picture is a picture having a picture number of "0" (the reproduction time thereof is 0.0000 (s)), the reproduction time of the destination picture (hereinafter, simply referred to as a "destination picture time") becomes 1.0000 (s) in the normal reproduction operation. A succeeding picture is the top picture of a GOP in which the destination picture is included, i.e., a succeeding GOP, no matter whether or not the destination picture is the top picture of the GOP.

Figure 4:
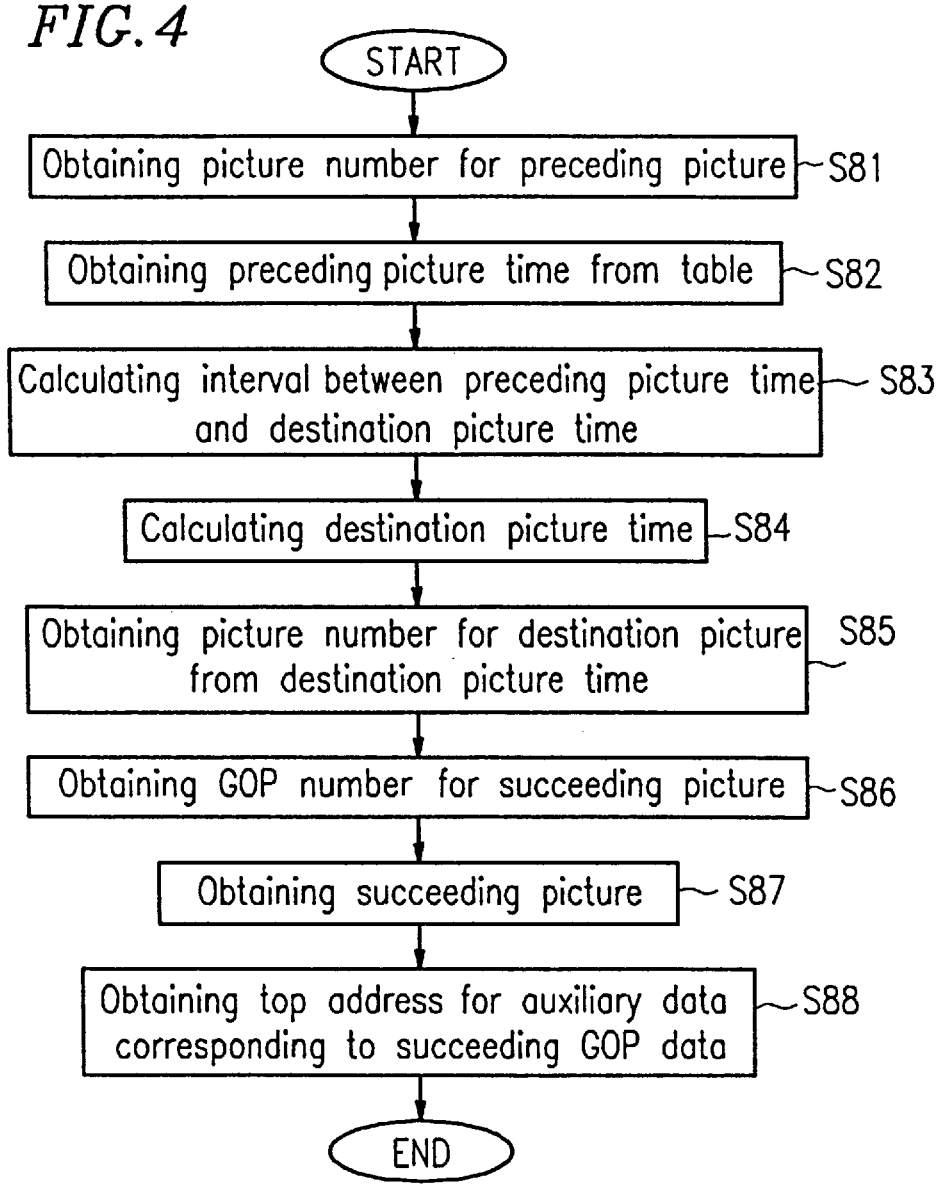
FIG. 4 is a flow chart illustrating a method for obtaining jump addresses based on the table.

FIG. 4 is a flow chart illustrating a method for obtaining the jump addresses from the table. Hereinafter, the method will be described with reference to FIG. 4 and Table 1.

In Step S81, a picture number is given for the preceding picture. Herein, the picture 0 included in the GOP data GOP1 is assumed to be the preceding picture.

In Step S82, the reproduction time of the preceding picture is obtained using the table. Herein, a preceding picture time of "0.0000 (s)" is obtained by reference to the column of the "reproduction time" of the picture 0.

In Step S83, the interval between the preceding picture time and the destination picture time is calculated based on the reproduction scale factor R. Herein, the reproduction scale factor R is assumed to be 30. Therefore, the interval between the preceding picture time and the destination picture time is: (the reproduction interval between two pictures)×(the reproduction scale factor R)=(1/30)×30=1 (s).

In Step S84, the reproduction time of the destination picture is calculated. The destination picture time is: (the preceding picture time)+(the interval between the preceding picture time and the destination picture time)=0.0000+1.0000=1.0000 (s).

In Step S85, a picture number is obtained for the destination picture using the destination picture time (1.0000 (s)). The picture number of the destination picture can be obtained by sequentially scanning the column of the "reproduction time" from the picture number 0 so as to find a picture number of which the reproduction time becomes equal to or larger than the destination picture time of 1.0000 (s) for the first time. In the example shown in Table 1, such a picture number is "30".

In Step S86, a GOP number is obtained for the succeeding GOP (or the GOP in which the destination picture, i.e., the picture 30, is included). Referring to the column of the "GOP number" of the picture 30, the GOP number is found to be "3".

In Step S87, the succeeding picture (or the top picture of the succeeding GOP) is obtained. The succeeding picture can be obtained by sequentially scanning the column of the "GOP number" from the GOP number 1 in Table 1 so as to find a picture number of which the GOP number becomes equal to the GOP number 3 for the first time. In the example shown in Table 1, such a picture number is "18".

In Step S88, the top address is obtained for the auxiliary data corresponding to the succeeding GOP in which the succeeding picture is included by reference to Table 1. Referring to the column of "top address of auxiliary data" in the line of the picture 18, i.e., the succeeding picture, in Table 1, the top address of the auxiliary data corresponding to the succeeding GOP is found to be "158". This value "158" is recorded at the sector address 0 as the jump address of the picture 0, i.e., the preceding picture, when the reproduction scale factor R is 30 (or the interval between the preceding picture time and the destination picture time is 1 (s)). This sector address 0 is the sector address at which the jump address of the auxiliary data corresponding to the data of GOP1 or the preceding GOP is recorded.

FIG. 3 will be referred to again. In Step S9, a formatting operation is performed so that the auxiliary data including the jump address generated in Step S8 and the GOP data corresponding to the auxiliary data are adjacent to each other on the recording medium, thereby outputting the data thus obtained as a recording data stream. Referring to FIG. 2 again, this operation will be described specifically. The jump address generated by performing the formatting operation in Step S9 is located in the data area DA of the sector 0 (as JA1), for example. In this specification, the "auxiliary data" refers to the data recorded in the sectors other than the sectors in which the GOP data is included, e.g., the sectors 2 to 14 and 17 in FIG. 2, that is to say, the data recorded in the sectors, e.g., the sectors 0 and 1 in FIG. 2, adjacent to and anterior to the sectors in which the GOP data is recorded. In the same way as the GOP data, the jump address included in the auxiliary data is also recorded in the data area DA (2048 bytes) in a sector.

The auxiliary data is disposed so as to be adjacent to the top of each GOP data. Therefore, in the column of "top address of auxiliary data" in Table 1, the top sector addresses of the sectors, in which the auxiliary data corresponding to the respective GOP data is recorded, are shown.

In Step S10, the recording data stream generated in Step S9 is subjected to various kinds of processing such as the addition of an error correction signal, and a digital modulation, thereby generating a recording signal. As an error correction method, a Reed-Solomon Product Code (RS-PC) method is employed. As a modulation method, an eight to sixteen modulation is employed.

In Step S11, by supplying the recording signal obtained in Step S10 to an optical head for writing, the recording data stream is written on the tracks on the optical disk.

In the foregoing description, all the steps are sequentially processed. However, the processing may be performed in a different manner. For example, Steps S4 and S5 may be processed in parallel. In addition, the order of the respective steps is not limited to that shown in FIG. 3. For example, the processing order of Steps S3 to S5 is interchangeable.

Figure 5A:
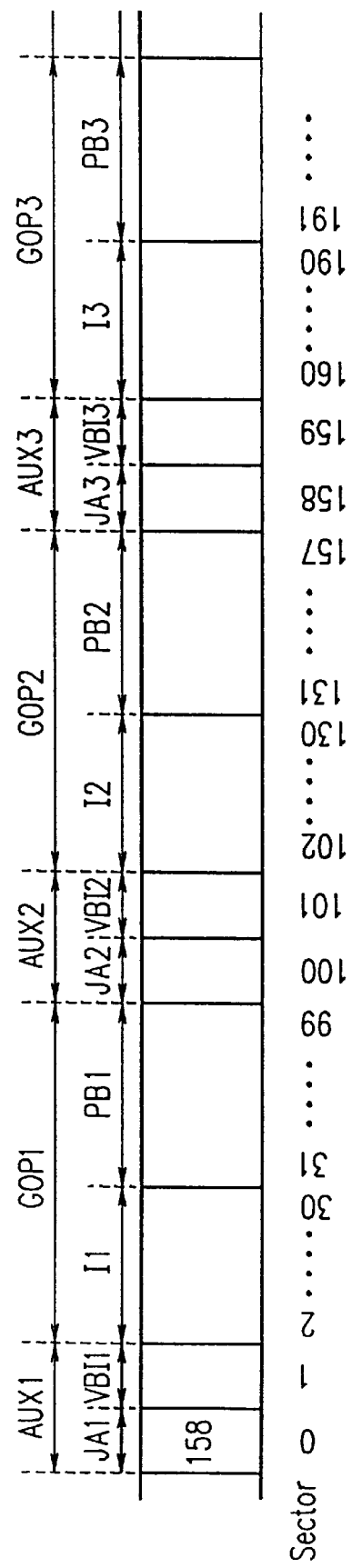
FIG. 5 is a structure diagram illustrating the jump addresses in the image information recording apparatus and method in the first example of the present invention.
Figure 5B:
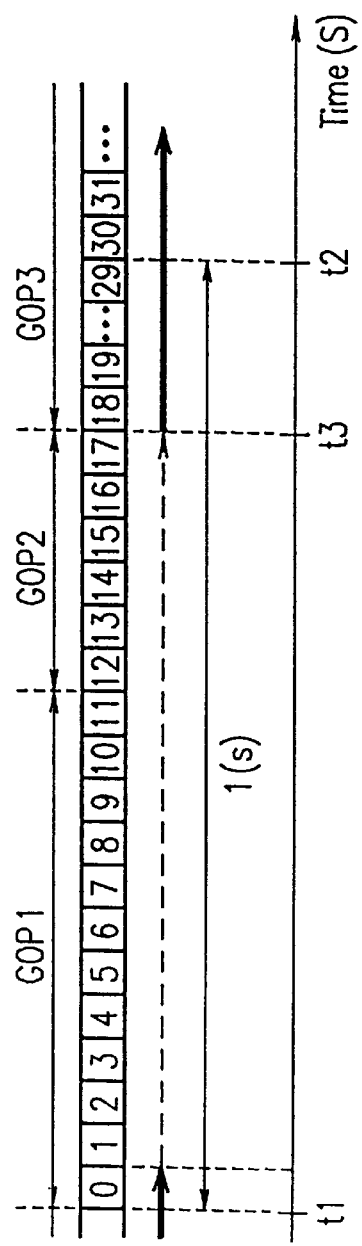

FIG. 5 is a structure diagram illustrating the jump addresses in the image information recording apparatus and method in the first example of the present invention. It is assumed that the high-speed reproduction operation is performed using the table shown in Table 1 both in the portions (A) and (B) in FIG. 5.

In FIG. 5, the data to be recorded on the sectors on the optical disk are schematically shown in the portion (A). The GOP data GOP1 includes the intra-coded picture data I1 and the inter-coded picture data PB1. The inter-coded picture data PB1 includes the P picture data and/or the B picture data. That is to say, the inter-coded picture data PB1 corresponds to the data stream "B1, B2, P1, B3, B4, P2, . . . P4, S" shown in FIG. 2. However, the GOP data is not limited thereto, but may be composed of intra-coded picture data only without any inter-coded picture data.

The auxiliary data AUX1, located immediately anterior to the GOP data GOP1, includes a jump address JA1 and video blanking information VBI1. The jump address JA1 is located at the sector address 0 which is anterior to the top sector of the GOP data GOP1 by two sectors. The auxiliary data AUX1 corresponds to the GOP data GOP1. The auxiliary data AUX1 indicates the top sector address of the auxiliary data corresponding to the GOP data in which the destination picture data is included.

More specifically, if the picture 0 or the top picture of the GOP data GOP1 is assumed to be the preceding picture as described referring to Table 1 and the reproduction scale factor R is assumed to be 30, then it is necessary to reproduce a picture to be reproduced in the normal reproduction operation 1 (s) later than the time when the picture 0 or the preceding picture is reproduced. That is to say, a picture reproduced in the normal reproduction operation at the destination picture time t2 which is 1 (s) later than the preceding picture time t1 is the destination picture. Herein, the destination picture is the picture 30. The succeeding picture is the top picture of the GOP data GOP3 in which the destination picture 30 is included, i.e., the picture 18. Therefore, in performing the high-speed reproduction in which the reproduction scale factor R is 30, the picture 18 or the succeeding picture is reproduced in succession with the reproduction of the picture 0 or the preceding picture. The picture 18 or the succeeding picture is reproduced at a time t3 in the normal reproduction operation.

The jump address JA1 corresponding to the GOP data GOP1 indicates the top sector address of the auxiliary data corresponding to the GOP data in which the destination picture is included. As shown in the portion (A) in FIG. 5, the top sector address of the auxiliary data AUX3 corresponding to the GOP data GOP3 or the succeeding GOP, i.e., "158", is recorded in the jump address JA1 corresponding to the GOP data GOP1.

Ideally, the reproduction should be started from the picture 30 or the destination picture. However, in the first example, the picture 18 or the succeeding picture is reproduced by reading out the data of GOP3 or the succeeding GOP from the top thereof. As a result, it is possible to advantageously simplify hardware and software for realizing the high-speed reproduction operation of the first example.

It is noted that it is impossible to predict when a high-speed reproduction command is given by a user to a reproducing apparatus in actually using the reproducing apparatus. Therefore, a high-speed reproduction command is possibly given by a user when the picture 3 shown in the portion (B) in FIG. 5 is being reproduced, for example. However, in the first and the second examples, the preceding picture is assumed to be nothing but the top picture of a preceding GOP, e.g., a picture 0, 12 or 18 shown in the portion (B) in FIG. 5. Therefore, the preceding picture time is set to be the time t1 when the top picture of a preceding GOP is normally reproduced.

In the case of making variable the reproduction scale factor R for a high-speed reproduction operation, it is necessary to record the jump addresses corresponding to the respective reproduction scale factors R. For example, in order to realize the reproduction scale factors R of ±15, ±30, ±75 and ±300, it is necessary to record eight kinds of jump addresses in total. Herein, the codes "+" and "−" of the reproduction scale factor R indicate "forward direction" and "backward direction", respectively.

Figure 6:
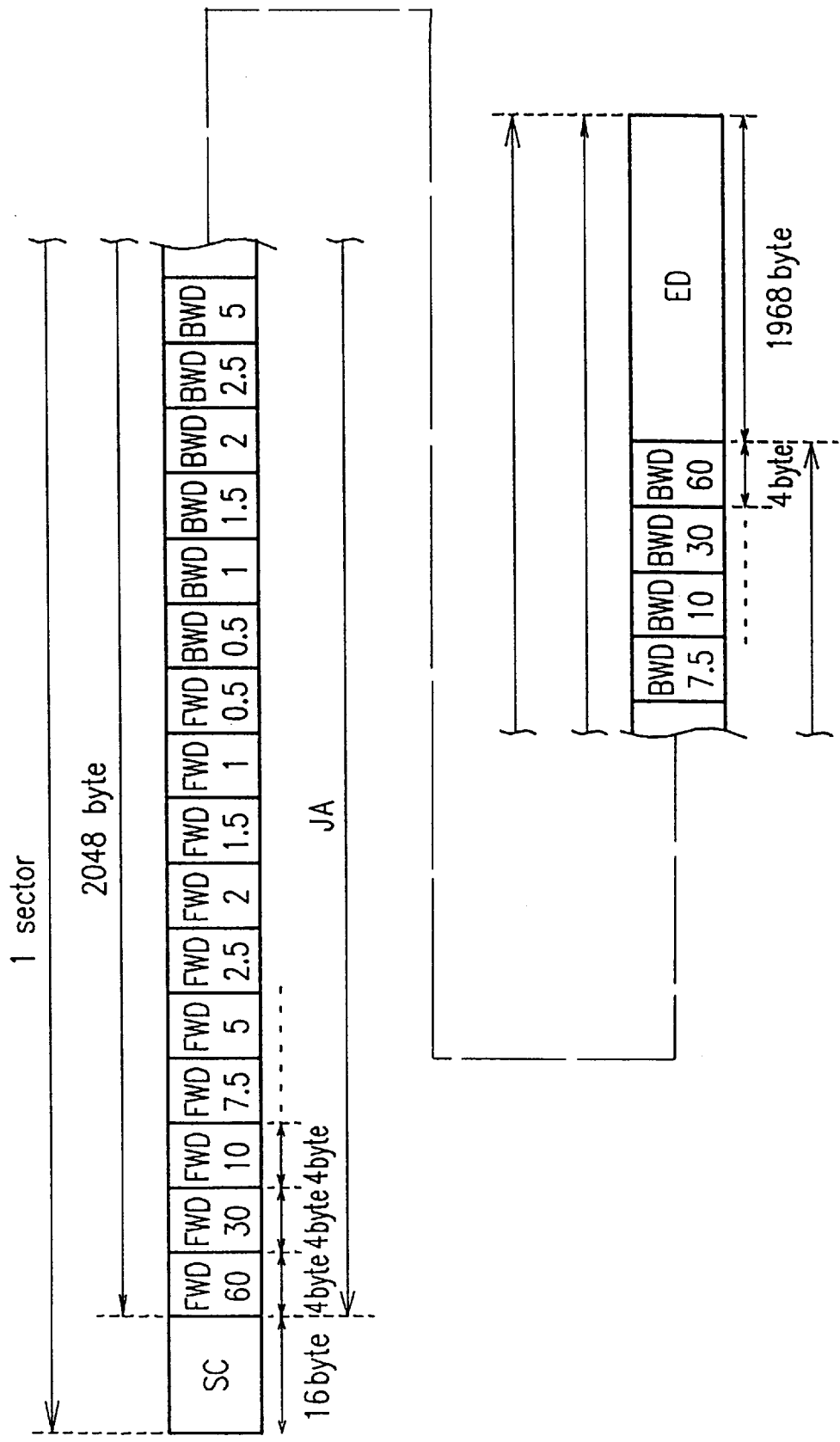
FIG. 6 is a format chart showing a format for a jump address JA corresponding to a plurality of reproduction scale factors.

FIG. 6 is a format chart showing a format for the sector including jump addresses JA corresponding to a plurality of reproduction scale factors R. The sub-code SC, the jump addresses JA and the extra data ED shown in FIG. 6 correspond to the sector 0 (JA1) shown in FIG. 2, for example. The jump addresses JA and the extra data ED shown in FIG. 6 are recorded in the data area DA (2048 bytes) shown in FIG. 2. The jump addresses JA used in the first example include addresses FWD60, FWD30, FWD10, FWD7.5, FWD5, FWD2.5, FWD2, FWD1.5, FWD1, . . . BWD7.5, BWD10, BWD30, and BWD60 (each of which has 4 bytes) and extra data ED (1968 bytes) in this order from the top thereof. In these addresses, the reference code "FWD" indicates a forward high-speed reproduction operation, while the reference code "BWD" indicates a backward high-speed reproduction operation. The numeral following "FWD" or "BWD" indicates the interval between the preceding picture time and the destination picture time. For example, "FWD10" in FIG. 6 indicates the top sector address of the auxiliary data corresponding to the GOP including the destination picture to be normally reproduced 10 seconds later than the preceding picture time in the forward high-speed reproduction operation. In addition, various kinds of data, such as a time when the reproduction of the GOP is started and a sector address at which sound data corresponding to the GOP data is recorded, can be recorded as the extra data ED.

Assuming that a time when a preceding picture is normally reproduced is denoted by T1 and a time when a destination picture is normally reproduced is denoted by T2 and that a positive value $\Delta Ti$ (where i=1 to n, i and n are natural numbers) is used, the time T2 in the case shown in FIG. 6 can be represented as:

$$T2 = T1 \pm \mathrm{E}\Delta Ti$$

where "E" indicates a summation for i=1 to n, and 1<=n<= nmax (nmax: natural number). In FIG. 6, nmax=10, $\Delta T1 = \Delta T2 = \Delta T3 = \Delta T4 = \Delta T 5 = 0.5$ (s), $\Delta T6 = \Delta T7 = \Delta T8 = 2.5$ (s), $\Delta T9 = 20$ (s), and $\Delta T10 = 30$ (s). That is to say, in the case shown in FIG. 6, $\Delta Ti$ monotonically increases for the variable i. In other words, $\Delta Ti$ either remains the same or increases when the variable i increases. As a result, it is possible to advantageously realize reproduction scale factors R over a wide range while saving the region in which the jump address is recorded.

In general, when the reproduction operation is performed at a lower speed as compared with the high-speed reproduction operation, a high precision is required. However, the higher the speed of the reproduction operation becomes, the lower the necessary precision becomes. Accordingly, in the case where the reproduction scale factor R is small, or the case where the jump distance (i.e., the interval between the preceding picture time and the destination picture time) is temporally short, it is preferable for the kinds of the jump addresses to be larger. To the contrary, in the case where the reproduction scale factor R is large, the kinds of the jump addresses may as well be small. The jump address table shown in FIG. 6 includes jump addresses for realizing 10 kinds of reproduction scale factors R in the forward direction and 10 kinds of reproduction scale factors R in the backward direction, i.e., 20 kinds of scale factors in total. However, the jump addresses are not limited to the addresses corresponding to the 20 kinds of reproduction scale factors R, but may include only the 10 kinds of jump addresses used for the forward high-speed reproduction operation in the above-described example. In addition, the interval between the preceding picture time and the destination picture time is not limited to the values (such as 0.5 (s), 1.0 (s), 1.5 (s), 2.0 (s) and 2.5 (s)) exemplified above.

In the above equation, the natural number nmax is preferably equal to or more than five. More preferably, the natural number nmax is equal to or more than ten.

Figure 7:
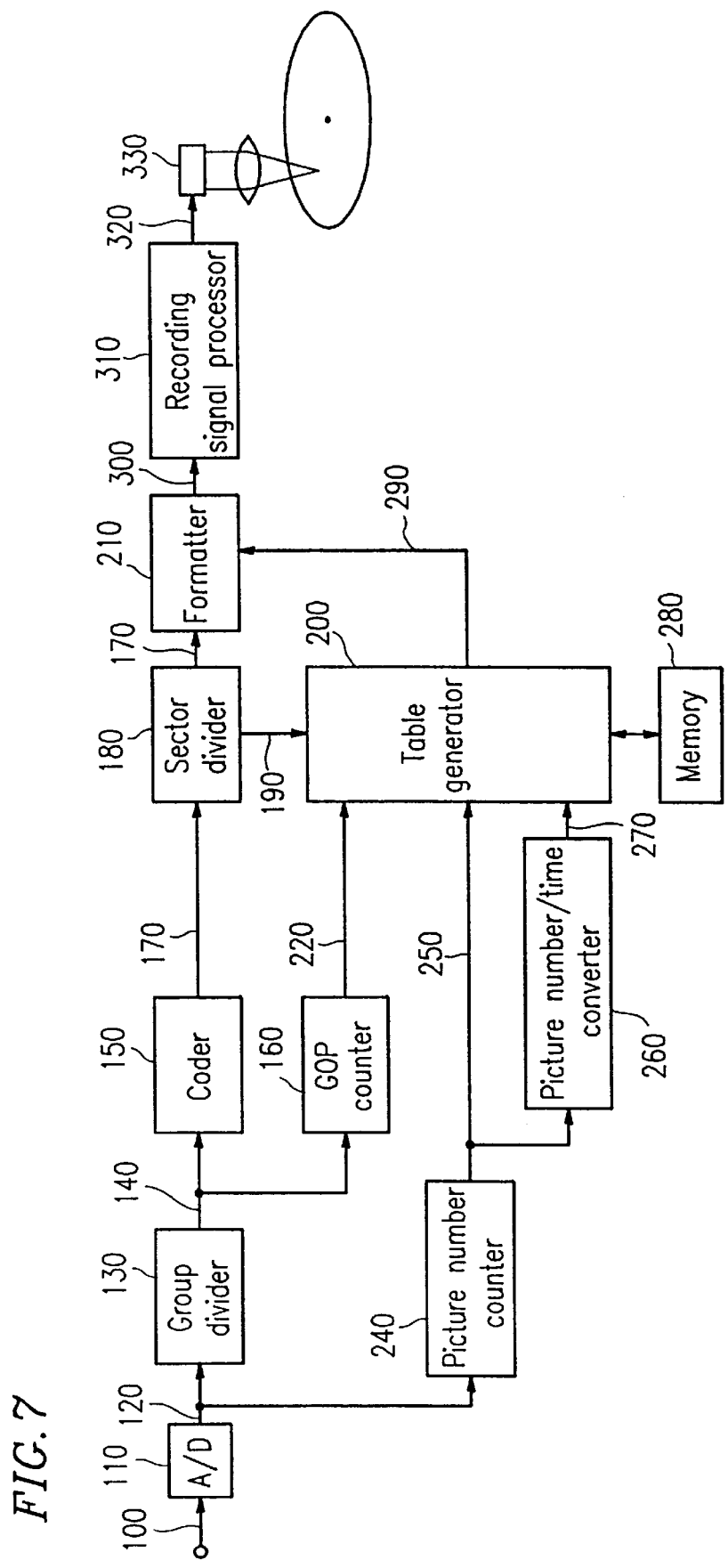
FIG. 7 is a block diagram showing a configuration for the image information recording apparatus in the first example of the present invention.

FIG. 7 is a block diagram showing a configuration for the image information recording apparatus in the first example of the present invention, or a configuration for an apparatus for implementing the image information recording method of the invention as has been described mainly referring to FIGS. 3 to 5. A video signal 100 is input to an A/D converter 110. The video signal 100 is a signal having a format complying with the NTSC standard or the PAL standard mentioned above. The A/D converter 110 receives the video signal 100 so as to convert the signal into picture data 120 represented by binary data. The picture data 120 is data representing the pictures to be displayed at an interval of 1/30 (s), for example. More specifically, the picture data 120 is data having a format defined in compliance with the Recommendation BT.601 of ITU-R.

A group divider 130 receives the picture data 120 and divides the data into a plurality of groups so that each of the groups includes a predetermined number of pictures, thereby generating GOP data 140 and outputting the data to a coder 150 and a GOP counter 160. In the case where the GOP data 140 includes a plurality of picture data, the plurality of picture data included in the GOP data 140 are successive on the time axis. The number of the pictures represented by one GOP data 140 can be set at an arbitrary number depending upon the type of the image, the number of the entry points in the trick play reproduction operation and the like. A group start code indicating the top of the GOP data is added to the header of the GOP data 140 output from the group divider 130.

The coder 150 performs a compression coding processing on a GOP basis for the GOP data 140, thereby outputting the coded GOP data 170 to a sector divider 180. The GOP data 140 is compression-coded so as to include at least intra-coded picture data (I picture data). In the case where the GOP data 140 includes a plurality of picture data, the compression rate can be increased by performing an inter-picture coding instead of the intra-picture coding depending on the necessity. To the contrary, a case where the coded GOP data 170 include no inter-coded picture data (P picture data and B picture data) can also occur. The intra-picture coding and the inter-picture coding are implemented by known methods.

The sector divider 180 receives the coded GOP data 170, thereby calculating the sector addresses on the optical disk at which the GOP data 170 and the auxiliary data corresponding to the respective GOP data 170 are recorded. The sector divider 180 outputs not only the data 190 indicating the calculated sector addresses to a table generator 200 but also the GOP data 170 to a formatter 210. The sector divider 180 calculates the sector addresses based on the length of GOP data, the length of auxiliary data and the sector length. The sector divider 180 includes a counter having an initial value of "0" and an increment of "1". Since the auxiliary data is recorded immediately anterior to the GOP, the sector divider 180 first increments the count value from "0" to "2". Next, the sector divider 180 receives the GOP data 170 and increments the count value by "1" every time 2048 bytes, i.e., the length of the data area, are input thereto. By performing such an operation, the sector divider 180 generates the data 190 indicating the sector addresses at which the respective GOP data 170 are recorded and the sector addresses at which the auxiliary data corresponding to the respective GOP data are recorded. The sector divider 180 counts the data so that two sector addresses are skipped in the boundary between two GOP data, because the auxiliary data is recorded in the two sectors located in the boundary between two adjacent GOP data. The sector divider 180 detects the beginning of each GOP data by the group start code.

The GOP counter 160 calculates the GOP number of the GOP data 140 yet to be coded, thereby outputting the data 220 indicating the GOP number to the table generator 200. The GOP counter 160 includes a counter having an initial value of "1" and an increment of "1". By incrementing the count value by "1" every time one GOP data is input thereto, the GOP counter 160 generates the GOP numbers. The GOP counter 160 detects the input of one GOP data by examining the data amount of the input data thereof.

A picture number counter 240 calculates the picture numbers of the picture data 120 included in the GOP data 140, thereby outputting the data 250 indicating the picture numbers. The picture number counter 240 includes a counter having an initial value of "0" and an increment of "1". By incrementing the count value by "1" every time one picture data is input thereto, the picture number counter 240 generates the picture numbers. The picture number counter 240 detects the input of one picture data by examining the data amount of the input data thereof.

Although the GOP counter 160 and the picture number counter 240 perform count operation based on the input data amount, but the count operation is not limited to this. For example, the GOP counter 160 and the picture number counter 240 may count the GOP numbers and the picture numbers, respectively, based on the "group_start_code" and the "picture_start_code" (defined in MPEG 1 and MPEG 2 standards) included in the GOP data 170 output from the coder 150.

A picture number/time converter 260 calculates a time when each picture is reproduced in the normal reproduction operation based on the data 250 indicating the picture numbers, thereby outputting the data 270 indicating the time to the table generator 200. Specifically, the reproduction interval between two pictures in the normal reproduction operation is 1/30 (s) in the first example. Therefore, the picture number/time converter 260 outputs the data 270 indicating the product obtained by multiplying together "1/30 (s)", i.e., the time when the reproduction of the picture is started, and the "picture number" to the table generator 200.

The table generator 200 generates a table such as Table 1 using the data 220 indicating the GOP numbers, the data 250 indicating the picture numbers, the data 270 indicating the times when the pictures are reproduced in the normal reproduction operation and the data 190 indicating the sector addresses of the GOP data 170, thereby storing the generated table in a memory 280. The column of the "top address of auxiliary data" in Table 1 is generated in the following manner. Specifically, the table generator 200 outputs a sector address (e.g., "158" in GOP3 shown in Table 1) obtained by subtracting 2 (corresponding to the number of the sectors in which the auxiliary data is recorded) from the top sector address (e.g., a sector address "160" of GOP3 shown in Table 1) of the sectors in which each GOP is recorded as the "top address of auxiliary data" for all the pictures (e.g., the pictures having picture numbers equal to or larger than "18" in GOP3 shown in Table 1) included in the GOP. The table generator 200 performs the steps for obtaining the jump address from the table stored in the memory 280, described referring to Steps S7 and S8 shown in FIG. 3, by way of software, thereby outputting the jump addresses 290 to the formatter 210. Therefore, the table generator 200 can be typically implemented as a combination of a microprocessor and the associated programs stored in a memory 280.

The formatter 210 receives the GOP data 170 and the jump addresses 290, adds the auxiliary data including the jump addresses 290 to the GOP data 170, thereby outputting these data as recording data 300 to a recording signal processor 310. The recording format of the recording data 300 is the same as that shown in FIG. 2, while the recording format of the sectors including the jump addresses 290 among the auxiliary data is the same as that shown in FIG. 6. That is to say, the formatter 210 specifies the format so that the auxiliary data including the jump addresses 290 is recorded in the corresponding two sectors immediately anterior to the GOP data 170.

The recording signal processor 310 receives the recording data 300; subjects the data to various kinds of processing such as the addition of an error correction signal and a digital modulation; amplifies the recording signal 320 to a degree sufficient to drive an optical head 330 for recording; and then outputs the amplified signal to the optical head for recording 330. The optical head for recording 330 writes the recording data 300 on the tracks on the optical disk by irradiating light having an intensity corresponding to the recording signal 320 onto the optical disk.

FIG. 8 is a timing chart showing the respective data shown in FIG. 7. In FIG. 8, the data 220 indicating the GOP numbers is shown in the portion (A); the data 250 indicating the picture numbers is shown in the portion (B); the data 270 indicating the times when the pictures are reproduced in the normal reproduction operation is shown in the portion (C); and the data 190 indicating the sector addresses of the GOP data 170 is shown in the portion (D). In the portion (D) in FIG. 8, a vicinity of the boundary between the GOP data GOP2 and GOP3 is enlarged on the time axis and shown. The table generator 200 receives these data, generates a table and then outputs the table to the memory 280.

In the first example described above, the auxiliary data is assumed to be recorded in two sectors. However, the number of the sectors for recording the auxiliary data therein is not limited thereto, but may be one, or three or more. In the latter case, it is also preferable that the auxiliary data is recorded immediately anterior to the GOP data. In addition, it is also preferable for a jump address to indicate a top sector address of the sectors in which the auxiliary data corresponding to the succeeding GOP data is recorded.

The jump address may also be disposed in each of the sectors of I picture data instead of being recorded in only the top sector of the auxiliary data.

In the first example, a case where auxiliary information is provided for the I picture of each GOP has been described. However, in the case where the number of the pictures included in one GOP is small, for example, it is not always necessary to dispose the auxiliary data in all of the corresponding GOP data. In such a case, it is only necessary to dispose the auxiliary data so that the times when a picture of each GOP having auxiliary data is first reproduced in the normal reproduction operation are at substantially regular intervals. For example, the auxiliary data including the jump addresses is preferably recorded on the recording medium so that the intra-coded picture data is reproduced at an interval in a range from 0.4 (s) to 1.0 (s) (both inclusive), in the normal reproduction operation, wherein the intracoded picture data is recorded adjacent to the plurality of sectors in which the auxiliary data including the jump addresses is recorded. This enhances the time-axis linearity when the reproduction scale factor R is small.

EXAMPLE 2

In the second example of the image information recording apparatus and method according to the present invention, data indicating a difference between the picture number of a destination picture and the picture number of a succeeding picture (hereinafter, such data will be referred to as "offset data") together with the jump addresses are recorded on the optical disk as auxiliary data. By using this offset data, the reproduction can be muted until the time when the destination picture is reproduced. As a result, it is possible to exactly seek a picture and further improve the time-axis linearity in the high-speed reproduction operation. In the following explanation, only the points different from the first example will be described.

FIGS. 4 and 5 will be referred to again. The offset data is a number obtained by subtracting the picture number of a succeeding picture (i.e., 18) from the picture number of a destination picture (i.e., 30), e.g., 30−18=12 in FIG. 5. In the case of recording a plurality of jump addresses, the offset data corresponding to the respective jump addresses are also recorded.

In Step S85 shown in FIG. 4, the picture number of a destination picture is obtained. In Step S87, the picture number of a succeeding picture is obtained. Therefore, in this second example, a step of calculating the difference, i.e., (the picture number of the destination picture)−(the picture number of the succeeding picture), is performed as Step S89 after Step S88. From Step S89 on, the jump addresses and the offset data corresponding thereto may be treated as the auxiliary data instead of the jump addresses in the first example. For example, in Step S9 shown in FIG. 3, formatting is performed so that the jump addresses and the offset data are recorded within one sector.

Figure 9:
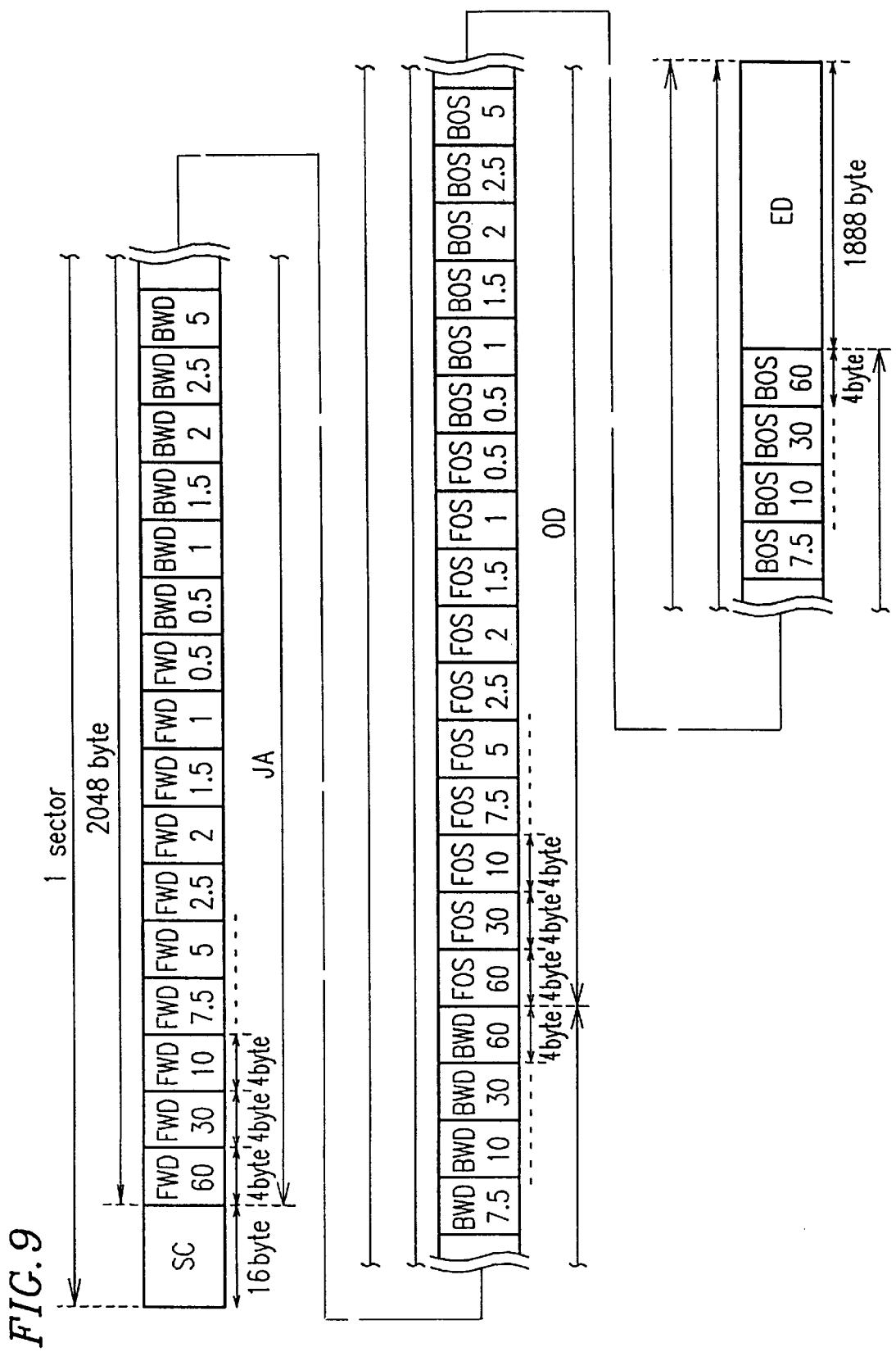
FIG. 9 is a format chart showing a format in which the jump addresses JA corresponding to a plurality of reproduction scale factors and the offset data OD corresponding to the respective jump addresses are recorded.

FIG. 9 is a format chart showing a format in which the jump addresses JA corresponding to a plurality of reproduction scale factors R and the offset data OD corresponding to the respective jump addresses are recorded. In FIG. 9, "FOS" indicates the offset data in a forward high-speed reproduction operation, while "BOS" indicates the offset data in a backward high-speed reproduction operation. The numeral following "FOS" or "BOS" indicates the interval between a preceding picture time and a destination picture time. For example, the offset data "FOS10" in FIG. 9 indicates the number obtained by subtracting the picture number of a succeeding picture from the picture number of a destination picture to be normally reproduced at a time 10 seconds later than the preceding picture time. The sub-code SC, the jump address JA, the offset data OD and the extra data ED shown in FIG. 9 correspond to JA1 shown in FIG. 2, for example. The jump address JA, the offset data OD and the extra data ED shown in FIG. 9 are recorded in the data area DA (2048 bytes) shown in FIG. 2, for example.

FIG. 7 will be referred to again. In the second example, the table generator 200 shown in FIG. 7 performs the calculation of the above-described Step S89, thereby generating the offset data. The generated offset data together with the jump addresses 290 shown in FIG. 7 are output to the formatter 210. As shown in FIG. 9, the formatter 210 specifies the format so that the sub-code SC, the jump address JA, the offset data OD and the extra data ED are recorded in this order in the top sector of the auxiliary data.

As described above, in this second example, a number obtained by subtracting the picture number of a succeeding picture from the picture number of a destination picture is recorded as the offset data. For example, in the case shown in Table 1, offset data "12" is obtained by subtracting the picture number "18" of the succeeding picture from the picture number "30" of the destination picture. This offset data "12" together with the jump address value "158" (the top address of the auxiliary data corresponding to the succeeding GOP) are recorded in the sector having a sector address "0" as the auxiliary data corresponding to the data of GOP1 in which the preceding picture (having a picture number 0) is included.

However, the offset data is not limited to the above-described difference between the picture numbers so long as the data corresponds to the difference between the picture number of a destination picture and the picture number of a succeeding picture. For example, data indicating the interval obtained by subtracting a succeeding picture time from a destination picture time may be recorded. For example, in the case shown in Table 1, by subtracting the succeeding picture time "0.6000 (s)" from the destination picture time "1.0000 (s)", "0.4000" is obtained as the offset data. This offset data "0.4000" together with the jump address value "158" (the top address of the auxiliary data corresponding to the succeeding GOP) may be recorded in the sector having a sector address "0" as the auxiliary data corresponding to the data of GOP1 in which the preceding picture (having a picture number 0) is included.

Also, it is preferable to record the offset data so as to correspond to all the jump addresses. However, the correspondence is not limited thereto. For example, the offset data may be recorded so as to be accompanied with jump addresses having a relatively low reproduction scale factor R.

Although each of the offset data shown in FIG. 9 has a data length of four bytes, the data length is not limited to this specific value. Especially in the case where the difference between the picture number of the succeeding picture and the picture number of the destination picture is recorded as the offset data, the data length of the offset data can be only one byte.

Hereinafter, a method for reproducing the image information which has been recorded by the method of the second example will be described. In the first example, in the case where a destination picture is different from a succeeding picture in the high-speed reproduction operation, the succeeding picture is reproduced immediately after the reproduction of the destination picture. On the other hand, in this second example, the offset data recorded on the recording medium can be used in the reproduction operation unlike the first example. By muting the reproduction of pictures during a period corresponding to the offset data, the destination picture can be reproduced immediately after the reproduction of the preceding picture without reproducing the succeeding picture. As a result, the destination picture is always reproduced immediately after the preceding picture is reproduced, so that any picture demanded by a user can be advantageously and directly sought.

Figure 10:
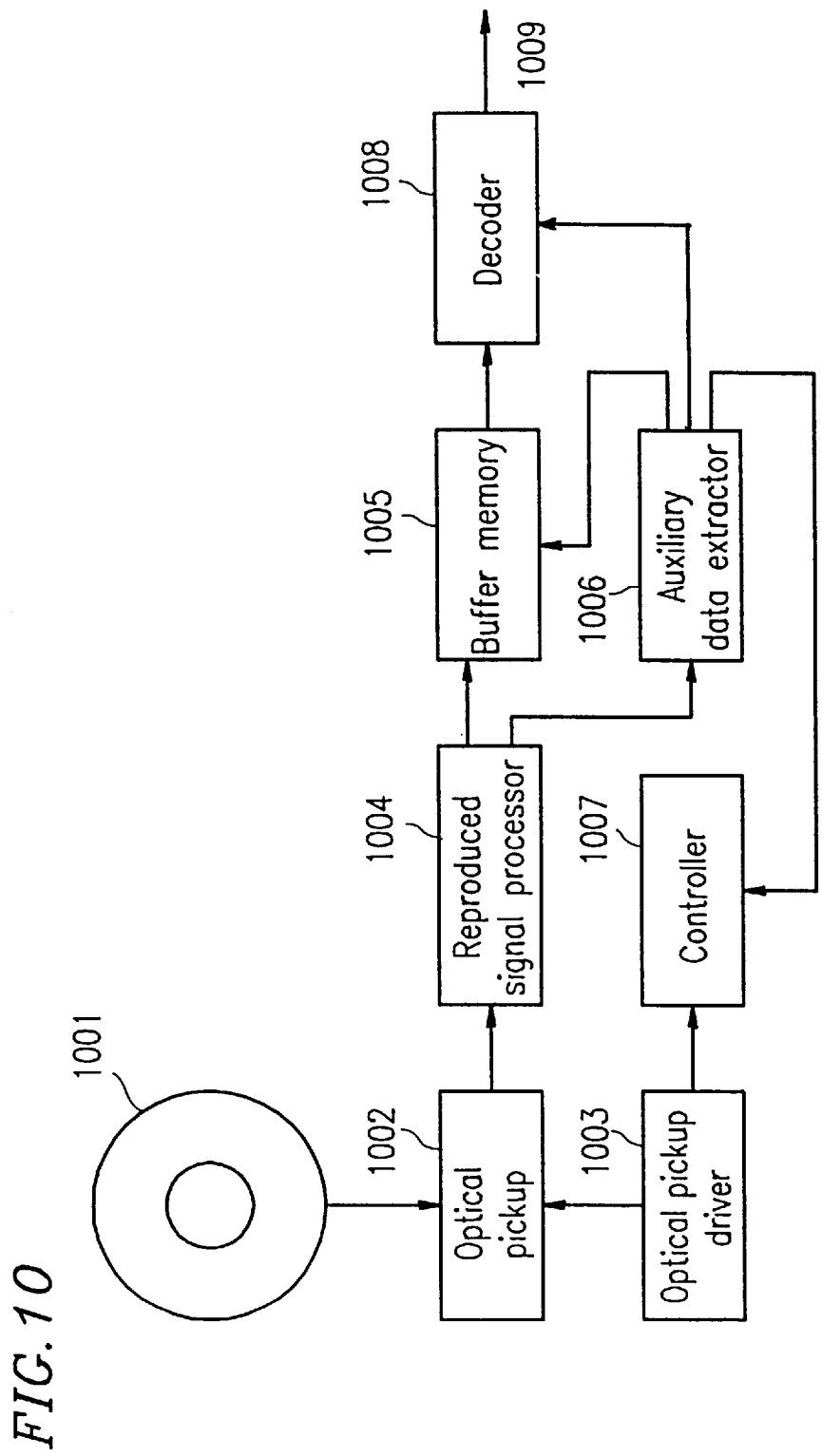
FIG. 10 is a block diagram showing a configuration for a reproducing apparatus for an optical disk on which image information has been recorded by the image information recording apparatus and method of the present invention.

FIG. 10 is a block diagram showing a configuration for a reproducing apparatus for an optical disk on which image information has been recorded by the image information recording apparatus and method of the present invention. This image information reproducing apparatus reproduces the image compression-coded information which has been recorded on a recording medium such as an optical disk by the image information recording apparatus and method in the first example described above. In the following description, an optical disk will be used as the recording medium. Alternatively, any other type of recording medium may also be used.

In FIG. 10, the reference numeral 1001 denotes an optical disk; 1002 denotes an optical pickup; 1003 denotes an optical pickup driver; 1004 denotes a reproduced signal processor; 1005 denotes a buffer memory; 1006 denotes an auxiliary data extractor; 1007 denotes a controller; and 1008 denotes a decoder. Hereinafter, the operation of the reproducing apparatus will be described.

In the reproduction operation, a signal reproduced from the optical disk 1001 by the optical pick-up 1002 is supplied to the reproduced signal processor 1004. The reproduced signal processor 1004 subjects the signal to various kinds of processing such as digitization, digital demodulation and error correction. The data output from the reproduced signal processor 1004 is supplied to the auxiliary data extractor 1006 and the buffer memory 1005. The auxiliary data extractor 1006 extracts the auxiliary data. The auxiliary data output from the auxiliary data extractor 1006 is supplied to the controller 1007, thereby controlling the optical pickup driver 1003. The output from the buffer memory 1005 is supplied to and decoded by the decoder 1008 so that an image data 1009 is output.

The operation of the reproduction apparatus shown in FIG. 10 when high-speed reproduction at a constant reproduction scale factor R is performed will be described below. Assuming a currently retrieved GOP data is the preceding GOP data, the auxiliary data corresponding to the preceding GOP data which is located immediately before the preceding GOP data has been retrieved already by the auxiliary data extractor 1006. If a command for high-speed reproduction is applied by a user when a picture included in the preceding GOP is being reproduced in normal reproduction mode, the jump operation which enables track jump to a sector represented by the jump address included in the extracted auxiliary data will be conducted. The command for high-speed operation is given via an input interface (not shown) by the user to the controller 1007. The controller 1007 retrieves the jump address from the extracted auxiliary data of the preceding GOP data, and outputs to the optical pickup driver 1003 a control signal for the track jump operation to jump to a sector represented by the jump address. This jump address is an address indicating a top sector among sectors in which the auxiliary data corresponding to the succeeding GOP is recorded.

After the track jump based on the jump address of the auxiliary data corresponding to the preceding GOP, auxiliary data corresponding to the succeeding GOP and an I picture data of the succeeding GOP data which is located immediately after the auxiliary data of the succeeding GOP data are retrieved, and then the I picture of the succeeding GOP is reproduced. Immediately after the reproduction of the I picture, the track jump to the next GOP based on a jump address included in the auxiliary data of the succeeding GOP data. Repetition of similar track jump and reproduction of the I picture results in the above-mentioned high-speed reproduction. Here, the jump addresses included in the respective auxiliary data are obtained in accordance with the first example of the present invention, and therefore the reproduction scale factor R is constant.

Among various data recorded in the second example, the offset data is used in the following manner. The offset data among the auxiliary data extracted by the auxiliary data extractor 1006 represents a difference between the picture number of a destination picture and the picture number of a succeeding picture. Therefore, in performing the high-speed reproduction operation, first, a track jump is performed for jumping to the sector in which the auxiliary data corresponding to the succeeding GOP has been recorded.

The buffer memory 1005 outputs the picture data to the decoder 1008. The decoder 1008 decodes the received picture data. The decoder 1008 does not output the decoded picture data between the time when the succeeding picture data is decoded and the time when the destination picture data is decoded (i.e., "mute" the decoded picture). Therefore, the decoder 1008 outputs the destination picture data as the image data 1009 immediately after the output of the preceding picture data. By performing this operation, the destination picture which is originally to be reproduced then can be reproduced immediately after the reproduction of the preceding picture. Instead of the mute operation, repetitive output of the succeeding picture can be performed until the destination picture is decoded in order to "freeze" (or hold) the succeeding picture until then.

As described above, according to the present invention, a top sector address among a plurality of sector addresses, at which the auxiliary data of a succeeding GOP is recorded, is recorded on the recording medium as a jump address among the auxiliary data of a preceding GOP. As a result, an image information recording apparatus and an image information recording method for implementing a recording medium exhibiting high time-axis linearity in the reproduction operation are provided.

In addition, according to the present invention, a parameter corresponding to a difference between a destination picture and a succeeding picture is recorded on the recording medium as offset data for the auxiliary data of a preceding GOP. As a result, an image information recording apparatus and an image information recording method for implementing a recording medium in which seeking can be performed precisely in the reproduction operation are provided.

The image information recording apparatus according to the present invention, as shown in FIG. 7, elements other than the A/D converter 110, the memory 280 and optical head for recording 330 can be implemented either by a microprocessor and a software program for controlling the microprocessor, or by a hardware such as an ASIC (application specific integrated circuit) as will be appreciated.

An image information recording apparatus according to the present invention may includes an image information reproducing unit therein. In other words, an "image information recording apparatus" in this specification includes an image information recording/reproducing apparatus. Similarly, an image information recording method according to the present invention may includes a step for reproducing image information.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image information recording apparatus comprising:
    a coder for generating a plurality of group data, each of the plurality of group data including at least one intra-coded picture data, by receiving and coding a plurality of picture data, each of the plurality of picture data corresponding to a picture;
    a sector address generator for generating a sector address indicating a top sector among a plurality of sectors on a recording medium in which auxiliary data corresponding to each of the plurality of group data is recorded, the auxiliary data corresponding to each of the plurality of group data being located immediately anterior to the group data;
    a jump address generator for determining for first group data among the plurality of group data, which of another of the plurality of group data, representing a second group data, includes second picture data to be reproduced in a normal reproduction operation at a second time later than a first time by a predetermined fixed time period, the first time being a time when first picture data located at a top of the first group data is reproduced in the normal reproduction operation, for determining a top sector address of the auxiliary data immediately anterior to the thereby determined second group data, and for outputting, as a jump address of the first group data at least for purposes of high speed reproduction the top sector address; and
    a recorder for recording the plurality of group data and the corresponding auxiliary data on the recording medium, with the auxiliary data corresponding to the first group data including the jump address.

2. An image information recording apparatus according to claim 1, wherein a top picture included in each of the plurality of group data is an intra-coded picture.

3. An image information recording apparatus according to claim 1, wherein the plurality of group data include different numbers of pictures.

4. An image information recording apparatus according to claim 1, wherein each of the plurality of group data includes at least one group of pictures (GOP).

5. An image information recording apparatus according to claim 4, wherein at least one of the plurality of group data includes a plurality of GOP8.

6. An image information recording apparatus according to claim 1, wherein a plurality of auxiliary data corresponding to respective second group data are recorded on the recording medium, the auxiliary data corresponding to the first group data including a plurality of jump addresses indicating respective locations on the recording medium at which the respective auxiliary data corresponding to the second group data are recorded, each of the second group data including second picture data which is reproduced during the normal reproduction operation at a respective second time later than the first time by a respective predetermined substantially fixed time period, and the respective predetermined substantially fixed time periods being different.

7. An image information recording apparatus according to claim 6, wherein the plurality of jump addresses comprises nmax jump addresses, the first time is denoted as T1, and the respective second times are denoted as T2 for n=1 to nmax as follows:

$$T2 = T1 + \sum_{i=1}^{n} \Delta Ti$$

where $\Delta Ti$ is a positive value for each value of i, and i, n and nmax are natural numbers.

8. An image information recording apparatus according to claim 7, wherein $\Delta Ti$ remains unchanged or is increased as a value of i increases from 1 to n.

9. An image information recording apparatus according to claim 8, wherein the auxiliary data including the jump addresses is recorded on the recording medium so that the intra-coded picture data is reproduced at an interval in a range from 0.4 (s) to 1.0 (s), both inclusive, in the normal reproduction operation, the intra-coded picture data being recorded adjacent to the plurality of sectors in which the auxiliary data including the jump addresses is recorded.

10. An image information recording apparatus according to claim 8, wherein the auxiliary data including the jump addresses includes offset data corresponding to a difference between a third time and the second time, the third time being a time when third picture data, located in a top sector of the second picture data, is reproduced in the normal reproduction operation.

11. An image information recording apparatus according to claim 10, wherein the offset data represents an interval between the second time and the third time.

12. An image information recording apparatus according to claim 10, wherein the offset data represents a difference between a picture number represented by the second picture data and a picture number represented by the third picture data.

13. An image information recording apparatus according to claim 6, wherein the plurality of jump addresses comprises nmax jump addresses, the first time is denoted as T1, and the respective second times are denoted as T2 for n=1 to nmax as follows:

$$T2 = T1 - \sum_{i=1}^{n} \Delta Ti$$

where $\Delta Ti$ is a positive value for each value of i, and i, n and nmax are natural numbers.

14. An image information recording apparatus according to claim 13, wherein $\Delta Ti$ remains unchanged or is increased as a value of i increases from 1 to n.

15. An image information recording method comprising the steps of:

generating a plurality of group data, each of the plurality of group data including at least one intra-coded picture data, by receiving and coding a plurality of picture data, each of the plurality of picture data corresponding to a picture;

generating a sector address indicating a top sector among a plurality of sectors on a recording medium in which auxiliary data corresponding to each of the plurality of group data is recorded, the auxiliary data corresponding to each of the plurality of group data being located immediately-anterior to the group data;

determining for first group data among the plurality of group data, which of another of the plurality of group data, representing a second group data, includes second picture data to be reproduced in a normal reproduction operation at a second time later than a first time by a predetermined fixed time period, the first time being a time when first picture data located at a top of the first group data is reproduced in the normal reproduction operation, determining a top sector address of the auxiliary data immediately anterior to the thereby determined second group data, and outputting, as a jump address of the first group data at least for purposes of high speed reproduction the top sector address; and recording the plurality of group data and the corresponding auxiliary data on the recording medium, with the auxiliary data corresponding to the first group data including the jump address.

16. An image information recording method according to claim 15, wherein a top picture included in each of the plurality of group data is an intra-coded picture.

17. An image information recording method according to claim 15, wherein the plurality of group data include different numbers of pictures.

18. An image information recording method according to claim 15, wherein each of the plurality of group data includes at least one group of pictures (GOP).

19. An image information recording method according to claim 18, wherein at least one of the plurality of group data includes a plurality of GOPs.

20. An image information recording method according to claim 15, wherein a plurality of auxiliary data corresponding to respective second group data are recorded on the recording medium, the auxiliary data corresponding to the first group data including a plurality of jump addresses indicating respective locations on the recording medium at which the respective auxiliary data corresponding to the second group data are recorded, each of the second group data including second picture data which is reproduced during the normal reproduction operation at a respective second time later than the first time by a respective predetermined substantially fixed time period, and the respective predetermined substantially fixed time periods being different.

21. An image information recording method according to claim 20, wherein the plurality of jump addresses comprises nmax jump addresses, the first time is denoted as T1, and the respective second times are denoted as T2 for n=1 to nmax as follows:

$$T2 = T1 + \sum_{i=1}^{n} \Delta Ti$$

where $\Delta Ti$ is a positive value for each value of i, and i, n and nmax are natural numbers.

22. An image information recording method according to claim 21, wherein $\Delta Ti$ remains unchanged or is increased as a value of i increases from 1 to n.

23. An image information recording method according to claim 22, wherein the auxiliary data including the jump addresses is recorded on the recording medium so that the intra-coded picture data is reproduced at an interval in a range from 0.4 (s) to 1.0 (s), both inclusive, in the normal reproduction operation, the intra-coded picture data being recorded adjacent to the sectors in which the auxiliary data including the jump addresses is recorded.

24. An image information recording method according to claim 22, wherein the auxiliary data including the jump addresses includes offset data corresponding to a difference between a third time and the second time, the third time being a time when third picture data, located in a top sector of the second picture data, is reproduced in the normal reproduction operation.

25. An image information recording method according to claim 24, wherein the offset data represents an interval between the second time and the third time.

26. An image information recording method according to claim 24, wherein the offset data represents a difference between a picture number represented by the second picture data and a picture number represented by the third picture data.

27. An image information recording method according to claim 20, wherein the plurality of jump addresses comprises nmax jump addresses, the first time is denoted as T1, and the respective second times are denoted as T2 for n=1 to nmax as follows:

$$T2 = T1 - \sum_{i=1}^{n} \Delta Ti$$

where $\Delta Ti$ is a positive value for each value of i, and i, n and nmax are natural numbers.

28. An image information recording method according to claim 27, wherein $\Delta Ti$ remains unchanged or is increased as a value of i increases from 1 to n.

29. A machine-readable recording medium comprising:
a plurality of pictures represented by picture data grouped and coded into a plurality of group data recorded on the recording medium, each of the group data comprising at least one intra-coded picture, with the plurality of group data recorded on the recording medium so as to be reproduced during a normal reproduction operation in time ordered succession; and
a first auxiliary data and a second auxiliary data recorded on the recording medium, the first auxiliary data corresponding to a given first one of the plurality of group data, the second auxiliary data corresponding to a second one of the plurality of group data, wherein the first auxiliary data includes a jump address indicating at least for purposes of high speed reproduction a location on the recording medium at which the second auxiliary data is recorded, such that the given first one of the plurality of group data includes first picture data which is reproduced during the normal reproduction operation at a first time and the second one of the plurality of group data includes second picture data which is reproduced during the normal reproduction operation at a second time later than the first time by a predetermined substantially fixed time period.

30. A machine-readable recording medium according to claim 29, wherein a top picture included in each of the plurality of group data is an intra-coded picture.

31. A machine-readable recording medium according to claim 29, wherein the plurality of group data include different numbers of pictures.

32. A machine-readable recording medium according to claim 29, wherein each of the plurality of group data includes at least one group of pictures (GOP).

33. A machine-readable recording medium according to claim 32, wherein at least one of the plurality of group data includes a plurality of GOPs.

34. A machine-readable recording medium according to claim 29, wherein a plurality of second auxiliary data corresponding to second ones of the plurality of group data are recorded on the recording medium, the first auxiliary data including a plurality of jump addresses indicating respective locations on the recording medium at which the respective second auxiliary data are recorded, each of the second ones of the plurality of group data including second picture data which is reproduced during the normal reproduction operation at a respective second time later than the first time by a respective predetermined substantially fixed time period, and the respective predetermined substantially fixed time periods being different.

35. A machine-readable recording medium according to claim 34, wherein the plurality of jump addresses comprises nmax jump addresses, the first time is denoted as T1, and the respective second times are denoted as T2 for n=1 to nmax as follows:

$$T2 = T1 + \sum_{i=1}^{n} \Delta Ti$$

where $\Delta Ti$ is a positive value for each value of i, and i, n and nmax are natural numbers.

36. A machine-readable recording medium according to claim 35, wherein $\Delta Ti$ remains unchanged or is increased as a value of i increases from 1 to n.

37. A machine-readable recording medium according to claim 34, wherein the plurality of jump addresses comprises nmax jump addresses, the first time is denoted as T1, and the respective second times are denoted as T2 for n=1 to nmax as follows:

$$T2 = T1 - \sum_{i=1}^{n} \Delta Ti$$

where $\Delta Ti$ is a positive value for each value of i, and i, n and nmax are natural numbers.

38. A machine-readable recording medium according to claim 37, wherein $\Delta Ti$ remains unchanged or is increased as a value of i increases from 1 to n.

39. An image information reproducing apparatus for reproducing information from a machine-readable recording medium according to 34, the apparatus comprising:
a reproduction head for reading the auxiliary data and the plurality of group data from the recording medium;
a controller, operatively coupled to the reproduction head during the high speed reproduction operation, for causing the reproduction head to read the jump address included in the auxiliary data corresponding to the given first one of the plurality of group data, read the first picture included in the given first one of the plurality of group data, and then jump to the auxiliary data of the corresponding second one of the plurality of group data.

40. An image information reproducing apparatus for reproducing information from a machine-readable recording medium according to 29, the apparatus comprising:
a reproduction head for reading the auxiliary data and the plurality of group data from the recording medium;
a controller, operatively coupled to the reproduction head during the high speed reproduction operation, for causing the reproduction head to read the jump address included in the auxiliary data corresponding to the given first one of the plurality of group data, read the first picture included in the given first one of the plurality of group data, and then jump to the auxiliary data of the corresponding second one of the plurality of group data.

* * * * *